United States Patent [19]
Eguchi et al.

[11] Patent Number: 5,623,476
[45] Date of Patent: Apr. 22, 1997

[54] RECORDING DEVICE AND REPRODUCTION DEVICE

[75] Inventors: Ken Eguchi; Haruki Kawada, both of Atsugi; Kunihiro Sakai, Yamato; Hiroshi Matsuda, Yokohama; Yuko Morikawa, Kawasaki; Takashi Nakagiri, Tokyo; Takashi Hamamoto, Yokohama; Masaki Kuribayashi, Inagi; Hisaaki Kawade; Yoshihiro Yanagisawa, both of Atsugi, all of Japan

[73] Assignee: Canon Kabushiki Kaisha, Tokyo, Japan

[21] Appl. No.: 482,789

[22] Filed: Jun. 7, 1995

Related U.S. Application Data

[63] Continuation of Ser. No. 740,876, Jul. 31, 1991, abandoned, which is a continuation of Ser. No. 668,399, Mar. 14, 1991, abandoned, which is a continuation of Ser. No. 136,728, Dec. 22, 1987, abandoned.

[30] Foreign Application Priority Data

| Dec. 24, 1986 | [JP] | Japan | 61-309433 |
|---|---|---|---|
| Dec. 24, 1986 | [JP] | Japan | 61-309434 |
| Feb. 19, 1987 | [JP] | Japan | 62-36139 |
| Mar. 11, 1987 | [JP] | Japan | 62-55851 |
| Mar. 11, 1987 | [JP] | Japan | 62-55852 |
| Jul. 31, 1987 | [JP] | Japan | 62-191862 |
| Jul. 31, 1987 | [JP] | Japan | 62-191863 |

[51] Int. Cl.$^6$ .................................. G11B 9/08
[52] U.S. Cl. .................................. 369/126; 365/151
[58] Field of Search .................. 369/126; 365/151, 365/118; 250/306

[56] References Cited

U.S. PATENT DOCUMENTS

| 3,683,337 | 8/1972 | Holton | 340/173 CC |
|---|---|---|---|
| 3,833,894 | 9/1974 | Aviram et al. | 369/151 |

(List continued on next page.)

FOREIGN PATENT DOCUMENTS

| 0049076 | 4/1982 | European Pat. Off. . |
|---|---|---|
| 0174860 | 3/1986 | European Pat. Off. . |
| 0186813 | 7/1986 | European Pat. Off. . |
| 0205187 | 12/1986 | European Pat. Off. . |
| 0247219 | 12/1987 | European Pat. Off. . |
| 0307211 | 3/1989 | European Pat. Off. . |
| 0307210 | 3/1989 | European Pat. Off. . |
| 3409406 | 9/1984 | Germany . |
| 3512060 | 4/1985 | Germany . |
| 3435 | 1/1974 | Japan . |
| 57-027447 | 2/1982 | Japan . |
| 58-12151 | 1/1983 | Japan . |
| 59-178603 | 10/1984 | Japan . |
| 0211849 | 9/1986 | Japan . |
| 2051456 | 1/1981 | United Kingdom . |
| 2182480 | 5/1987 | United Kingdom . |

OTHER PUBLICATIONS

Drake et al., "Tunneling Microscope for Operation in Air of Fluids", *Rev. Sci. Instrum.* 57(3), Mar. 1986, pp. 441–445.
Iwamura et al., "Rotating MNOS Dish Memory Device," *IEEE Transactions on Electron Devices*, vol. ED–28, No. 7, Jul. 1981, pp. 854–860.

(List continued on next page.)

*Primary Examiner*—David P. Porta
*Assistant Examiner*—David Vernon Bruce
*Attorney, Agent, or Firm*—Fitzpatrick, Cella, Harper & Scinto

[57] ABSTRACT

A recording device, comprising a probe electrode, a recording medium having electric memory effect and a writing voltage applying unit for applying voltage onto the recording medium from the probe electrode, and a reproducing device comprising a probe electrode, a recording medium exhibiting electric memory effect or a recording medium recorded by energy irradiation, a voltage applying unit for applying voltage not exceeding the threshold value voltage giving rise to electric memory effect onto the recording medium from the probe electrode and a reading unit for reading the change in current quantity passing through the recording medium.

195 Claims, 12 Drawing Sheets

U.S. PATENT DOCUMENTS

| | | | |
|---|---|---|---|
| 3,920,930 | 11/1975 | Sobczyk | 369/126 |
| 4,032,901 | 6/1977 | Levinthal | 365/151 X |
| 4,122,409 | 10/1978 | Marlett et al. | 331/94.5 M |
| 4,340,953 | 7/1982 | Iwamura et al. | 369/126 |
| 4,343,993 | 8/1982 | Binnig et al. | 250/306 |
| 4,489,278 | 12/1984 | Sawazaki | 324/457 |
| 4,534,015 | 8/1985 | Wilson | 365/106 |
| 4,561,087 | 12/1985 | Fox et al. | 369/276 |
| 4,575,822 | 3/1986 | Quate | 369/126 |
| 4,592,041 | 5/1986 | Senzaki et al. | 369/126 |
| 4,618,767 | 10/1986 | Smith et al. | 250/306 |
| 4,626,096 | 12/1986 | Ohtsuka et al. | 355/14 D |
| 4,665,313 | 5/1987 | Wells | 250/306 |
| 4,668,865 | 5/1987 | Gimzewski et al. | 250/306 |
| 4,672,578 | 6/1987 | Munakata et al. | 365/118 |
| 4,697,910 | 10/1987 | Kasuya | 355/3 R |
| 4,711,798 | 12/1987 | Ueda et al. | 369/288 X |
| 4,724,318 | 2/1988 | Binnig | 250/306 |
| 4,747,698 | 5/1988 | Wichrumasinghe et al. | 374/6 |
| 4,785,437 | 11/1988 | Dransfeld | 369/13 |
| 4,813,016 | 3/1989 | Okada et al. | 365/106 |
| 4,826,732 | 5/1989 | Kazan et al. | 428/432 |
| 4,829,507 | 5/1989 | Kazan et al. | 369/726 |
| 4,831,614 | 5/1989 | Duerig et al. | 369/101 |
| 4,878,213 | 10/1989 | Kazan et al. | 369/126 |
| 4,907,195 | 3/1990 | Kazan et al. | 365/118 |
| 4,945,515 | 7/1990 | Ooumi et al. | 365/151 |
| 4,962,480 | 10/1990 | Ooumi et al. | 365/151 |

OTHER PUBLICATIONS

Robinson, "IBm Images Surfaces by Electron Tunneling," *Science,* vol. 220 Apr. 1983, pp. 43–44.

Patent Abstracts of Japan, vol. 10, No. 327 (P–513) (2383), Nov. 7, 1986 (JP–A–61 132964, Jun. 20, 1986).

Kuhn, Thin Sol. Films, vol. 99 (1983) 1:16.

Sugi, J. Molec. Elec., vol. 1, No. 1 (1985) 3:17.

Fox, Chem. & Eng. News (May 23, 1983) 27:9.

Gerber, Rev. Sci. Instrum., No. 57, vol. 2 (Feb. 1986) 221:4.

G. Binning et al., *Physical Review Letters,* vol. 49, No. 1, Jul. 5, 1982, pp. 57–61.

G.L. Larkins et al, Langmuir–Blodgett Films As Barrier Layers In Josephson Tunnel Junctions, Thin Solid Films, 99, 277 (1983).

G.G. Roberts et al, GaP/Phthalocyanine Langmuir–Blodgett Film Electroluminescent Diode, Electronic Letters, 20, 489 (1984).

N.J. Thomas et al, GaAs/LB Film Miss Switching Device, Electronics Letters, 20, 838 (1984).

G.Binning et al, Scanning Tunneling Microscopy, Heleveica Physica Cata, 55, 726 (1982).

Courtney–Pratt, "High Capacity Memories . . . Medium", Tech. Digest, Western Electric, Sep. 1984, No. 75, p. 13.

Ishimoto et al., "Multiple Wavelength Optical . . . Films", Appl. Phys., Lett. vol. 49, (25) Dec. 1986, pp. 1677–1699.

McCord et al., "Lithography with the scanning tunneling microscope", J. Vac. Sci. Tech. B, vol. 4, No. 1, 1986, pp. 86–88.

(a)

(b)

RECORDING DEVICE AND REPRODUCTION DEVICE

This application is a continuation, of application Ser. No. 07/740,876, filed Jul. 31, 1991, now abandoned, which in turn, is a continuation of application Ser. No. 07/668,399 filed Mar. 14, 1991, now abandoned, which, in turn, is a continuation of application Ser. No. 07/136,728, filed Dec. 22, 1987, now abandoned.

BACKGROUND OF THE INVENTION

1. Field of the Invention

This invention relates to a recording device and a reproducing device. More particularly, the present invention relates to a recording device by use of a recording medium having a layer structure of an organic compound between a pair of electrodes one of which is made a probe electrode, and exhibiting memory effect for the switching characteristic of voltage and current, and also to a device for reproducing the information recorded on the recording medium.

2. Related Background Art

In recent years, uses of memory materials form the nucleus of electronics industries such as computers and their related instruments, video discs, digital audio discs, etc. and developments of their materials are also under active progress. The performances demanded for memory materials may differ depending on uses, but may generally include:

(1) high density and large recording capacity;

(2) rapid response speed of recording and reproduction;

(3) small power consumption;

(4) high productivity and low cost; etc.

Heretofore, semiconductor memories or magnetic memories employing magnetic material or semiconductor as the base material have been predominant, but with the advancement of laser technique, inexpensive and high density recording media with optical memory by use of an organic thin film such as organic dye, photopolymer, etc. are now emerging in the field of art.

On the other hand, recently, a scanning type tunnel microscope (hereinafter abbreviated as STM) capable of observing directly the electron structure of the surface atoms of a conductor has been developed [G. Binning et al, Helveica Physlca Cata, 55, 726 (1982)], and it has become possible to measure both single crystalline and amorphous materials with high resolving power of real space image. Besides, it has the advantage that observation can be made at low power without giving damage by current to the medium. Further, it can be actuated in air and applied to various materials, and therefore a broad scope of applications is expected.

STM is based on the phenomenon that tunnel current flows when the probe and an electroconductive substance were made to approach to a distance of about 1 nm with a voltage applied therebetween. This current is very sensitive to the distance change between the both, and by scanning the probe so that the tunnel current may be maintained to be constant, the surface structure of the real space can be drawn and at the same time a variety of information about the total electron cloud of the surface atoms can be read. Although analysis by use of STM is limited to electroconductive samples, it is becoming to be introduced to structural analysis of a monomolecular film very thinly formed on the surface of an electroconductive material, and application as the reproduction technique of high density record by utilizing the difference in the state of individual organic molecules may be also considered.

On the other hand, in the prior art, the method of forming a latent image by discharging or current supply by use of a needle-like electrode has been known as the electrostatic recording method, and a large number of applications for recording paper, etc. have been made (Japanese Laid-open Patent Publication No. 3435/1974).

The film thickness used for this electrostatic recording medium is order of microns, and there has been no report about an example in which the latent image on said medium is electrically read and reproduced.

Also, proposal of a molecular electronic device having imparted to one organic molecule the function of a logic element or memory element, etc. has been presented, and studies about the Langumuir-Blodgett film (hereinafter abbreviated as LB film) which may be regarded as one of the construction technique of molecular electronic device have been actively done. An LB film has laminated organic molecules regularly one molecular layer by one molecular layer, and the film thickness can be controlled in a unit of molecular length, whereby uniform and homogeneous ultra-thin film can be formed. As preparation of the device by making full avail of this specific feature, many attempts have been made to use an LB film as the insulating film. For example, there are tunnel junction element with a metal-insulator-metal (MIM) structure [G. L. Larkins et al, Thin Solid Films, 99, (1983)], an electroluminescent element with a metal-insulator-semiconductor (MIS) structure [G. G. Roberts et al, Electronics Letters, 20, 489 (1984)] or a switching element [N. J. Thomas et al, Electronics Letters, 20, 838 (1984)]. According to these series of studies, the element characteristics have been investigated, but the there still remain unsolved problems that reproducibility and stability are lacking, such as variance or change with lapse of time in characteristics in respective elements, etc.

In the prior art, the above investigations have been made primarily about LB films of fatty acid which can be handled with relative ease. However, from organic materials which has been deemed to be inferior in heat resistance and mechanical strength, there are being developed heat-resistant and mechanically stronger organic materials one after another. We have studied intensively in order to prepare a MIM element excellent in reproducibility and stability by using an LB film by use of these materials as the insulator, and consequently could successfully prepare a thin and uniform dye insulating film not found in the prior art. Also, as a consequence, a MIM element capable of exhibiting the switching phenomenon having an entirely novel memory function has been discovered.

SUMMARY OF THE INVENTION

More specifically, an object of the present invention is to provide a recording device and a reproducing device by use of a novel high density recording medium having memory characteristic for switching characteristics of voltage and current.

The present invention has specific features in a recording device, comprising a probe electrode, a recording medium exhibiting electric memory effect and a writing voltage applying means for applying voltage onto the recording medium from said probe electrode, and in a reproducing device comprising a probe electrode, a recording medium exhibiting electric memory effect or a recording medium recorded by energy irradiation, a voltage applying means for applying voltage not exceeding the threshold value voltage giving rise to electric memory effect onto the recording medium from said probe electrode and a reading means for reading the change in current quantity passing through said recording medium.

DETAILED DESCRIPTION OF THE PREFERRED EMBODIMENTS

Figure 1:
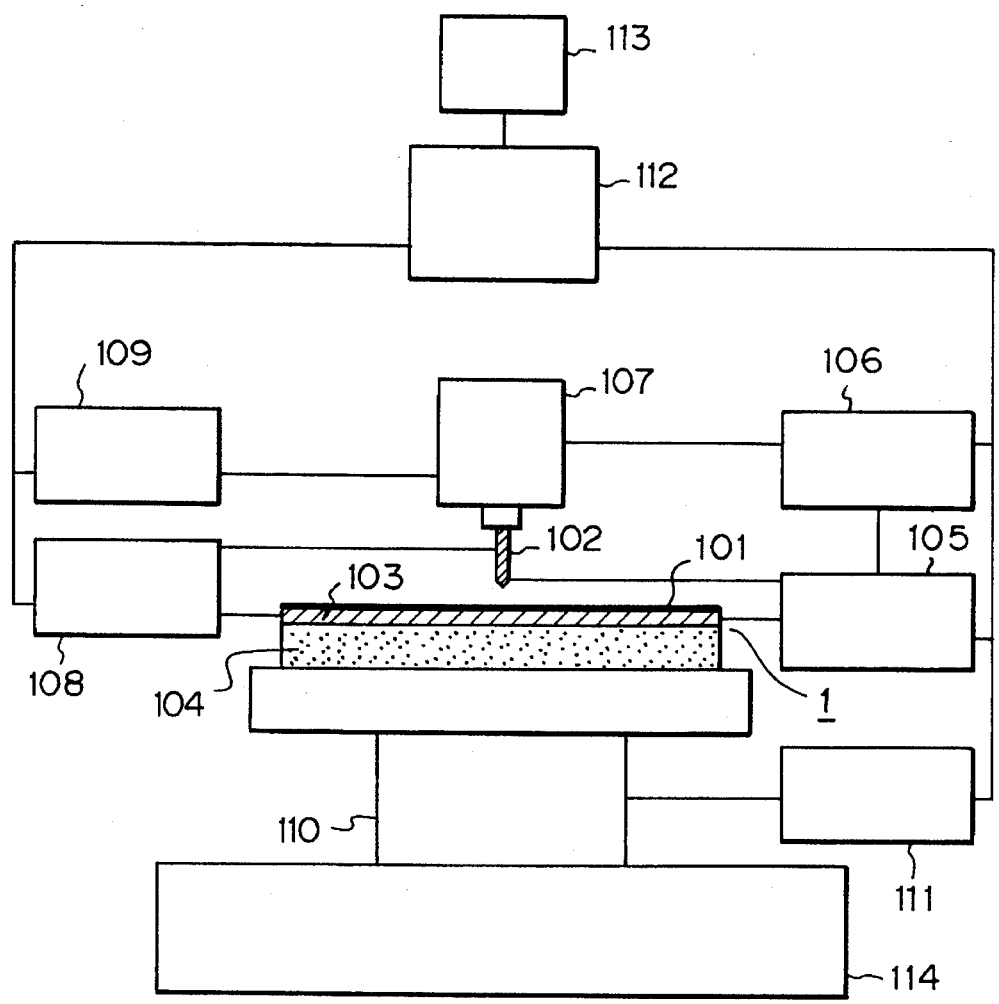
FIG. 1 illustrates diagramatically the current passage recording and reproducing device of the present invention.

The recording medium of the present invention, by employing an organic built-up film with molecules having a group having π-electron level and a group having only σ-electron level in combination laminated on an electrode, can exhibit a non-linear current-voltage characteristic different from the prior art by applying current by use of a probe electrode vertical to the film surface.

Since most of organic materials generally exhibit insulating or semi-insulating properties, a remarkable diversity of applicable organic materials having a group having π-electron level are included in the present invention.

As the structure of the dye having π-electron system suitable for the present invention, there may be included, for example, dyes having porphyrine skeleton such as phthalocyanine, tetraphenylporphyrine, etc.; azulene type dyes having squatilium group and croconic methine group as the bonding chain and cyanine-like dyes having two or more nitrogen-containing heterocyclic rings such as quinoline, benzothiazole, benzoxazole, etc. bonded through squarilium group and croconic methine group; or cyanine dyes, condensed polycyclic aromatic compounds such as anthracene and pyrene, and chain compounds obtained by polymerization of aromatic ring and heterocyclic compounds; and polymers of diacetylene group; further derivatives of tetraquinodimethane or tetrathiafluvalene and analogues thereof and charge transfer complexes thereof; and further metal complex compounds such as ferrocene, tris-bipyridine ruthenium complexes, etc.

Concerning formation of an organic recording medium, although the vapor deposition method or the cluster ion beam method may be applicable, an LB method is extremely suitable among the known techniques because of controllability, easiness and reproducibility.

According to the LB method, a monomolecular film of an organic compound having a hydrophobic site and a hydrophilic site in one molecule or a built-up film thereof can be formed easily on a substrate, which has a thickness on the molecular order and a uniform and homogeneous organic ultra-thin film can be supplied stably over a large area.

The LB method is a method in which a monomolecular film or its built-up film is prepared by utilizing the phenomenon that, in a molecule with a structure having a hydrophilic site and a hydrophobic site in a molecule, when the balance of the both (amphiphilic balance) is brought to a proper value, the molecule will form a layer of monomolecule on the water surface with the hydrophilic group directed downward.

Examples of the group constituting the hydrophobic site may include various hydrophobic groups generally known widely such as saturated and unsaturated hydrocarbon groups, condensed polycyclic aromatic groups and chain polycyclic phenyl groups, etc. These may constitute the hydrophobic moiety each individually or as a combination of a plurality thereof. On the other hand, most representative as the constituent of the hydrophilic moiety are, for example, hydrophilic groups such as carboxyl group, ester group, acid amide group, imide group, hydroxyl group, further amino groups (primary, secondary, tertiary, and quaternary), etc. These also constitute the hydrophilic moiety of the above molecule each individually or as a combination of a plurality thereof.

A dye molecule having these hydrophobic group and hydrophilic group in a well-balanced state and having π-electron system having an appropriate size can form a monomolecular film on the water surface, and it can be an extremely suitable material for the present invention.

Specific examples may include the molecules as shown below.

[I] Croconic methine dyes:

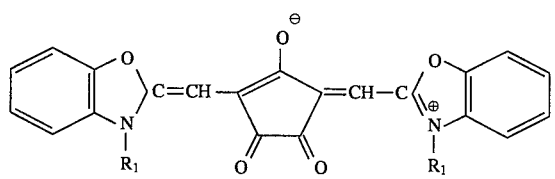

1)

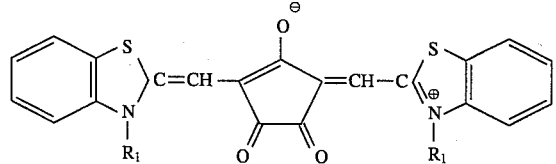
2)
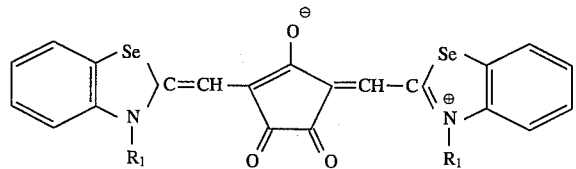
3)
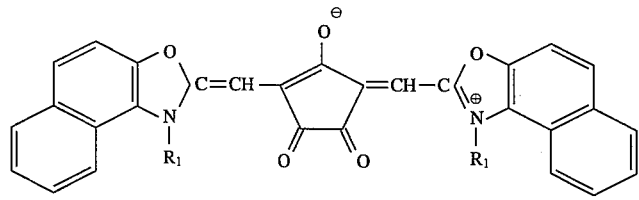
4)
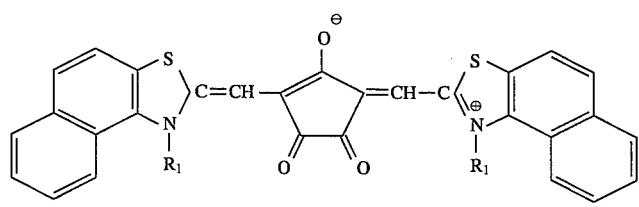
5)
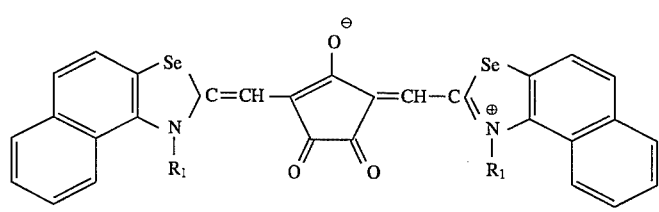
6)
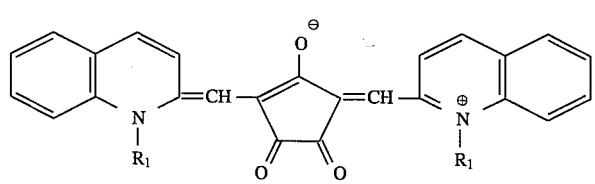
7)
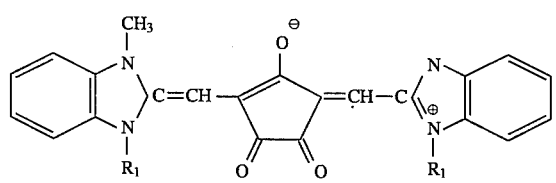
8)
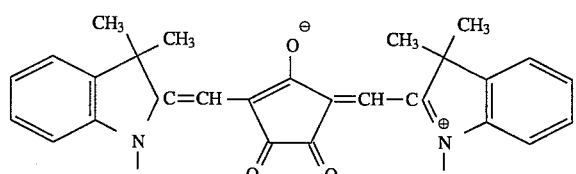
9)
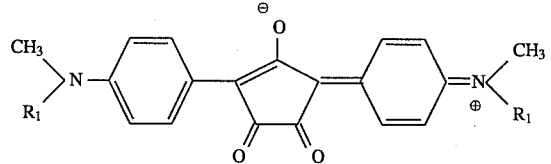
10)

10)

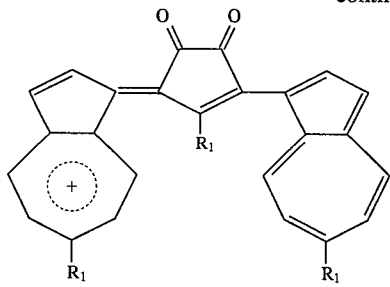

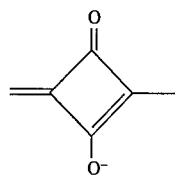

wherein $R_1$ corresponds to the group having π-electron level as mentioned above, and may be preferably a long chain alkyl group introduced with the carbon number n being $5<n<30$ for making easier formation of the monomolecular film on the water surface. The compounds mentioned above as specific examples show only the basic structures, and various derivatives of these compounds are also suitable in the present invention, as a matter of course.

[II] Squatilium dyes:

Compounds mentioned in [I] in which the croconic methine groups are replaced with the squatilium group having the following structure:

1)

[III] Porphyrine type dye compounds:

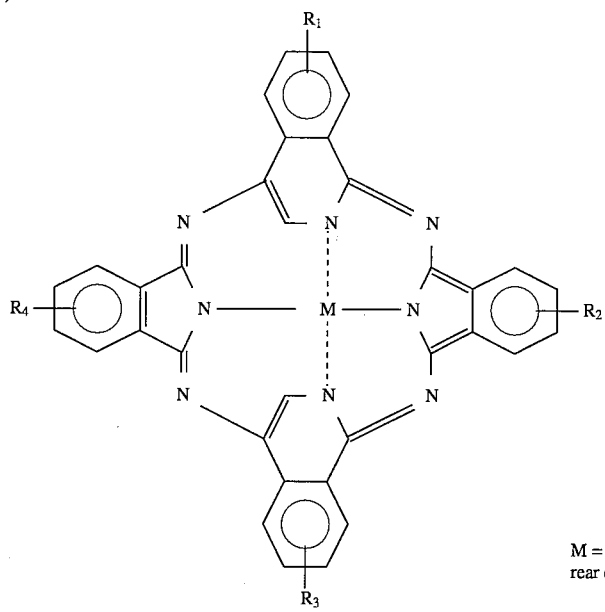

$R_1, R_2, R_3, R_4 = H$,

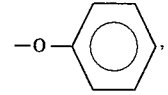

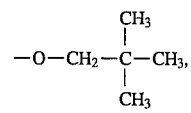

—$OC_5H_{11}$,

—$C(CH_3)_3$,

—$CH_2NHC_3H_7$ $M = H_2$, Cu, Ni, Al—Cl and rear earth metal ion

2)

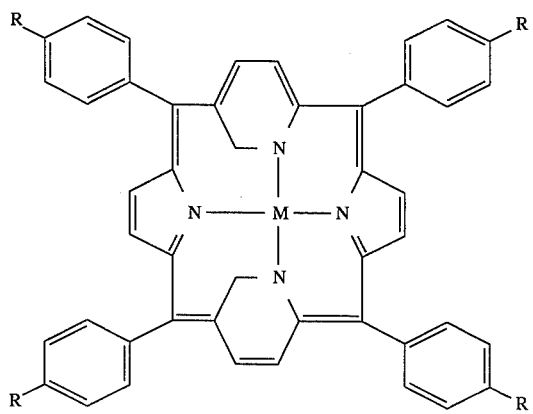

R = OCH(COOH)C$_n$H$_{2n+1}$ $5 \leq n \leq 25$

M = H$_2$, Cu, Ni, Zn, Al—C and rear earth metal ion

3)

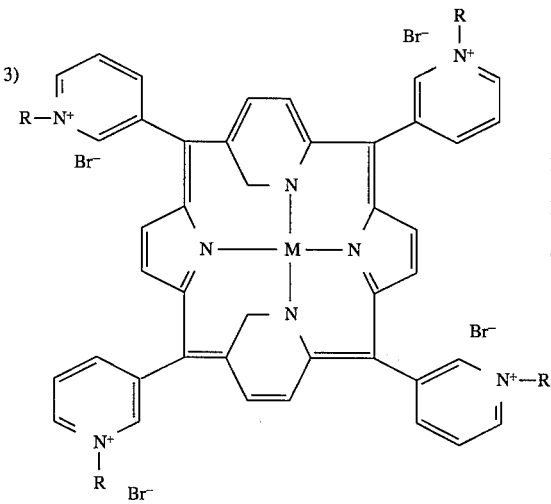

R = C$_2$H$_{2n+1}$    $5 \leq n \leq 25$

M = H$_2$, Cu, Ni, Zn, Al—Cl and rear earth metal ion

R is introduced for making easier formation of the monomolecular film, and is not limited to the substituents mentioned here. On the other hand, R$_1$–R$_4$ correspond to the group having σ-electron level as mentioned above.

[IV] Condensed polycyclic aromatic compounds:

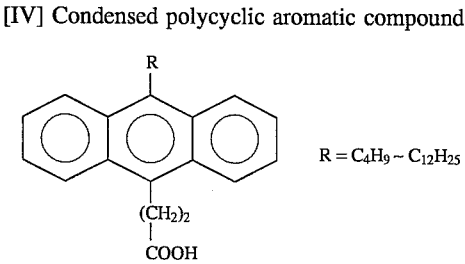

R = C$_4$H$_9$ ~ C$_{12}$H$_{25}$

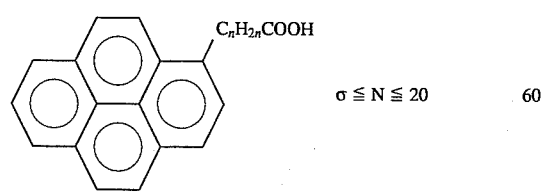

$\sigma \leq N \leq 20$

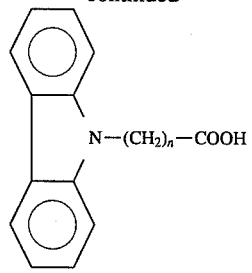

N—(CH$_2$)$_n$—COOH

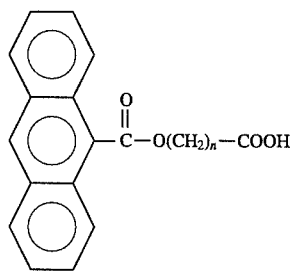

—C—O(CH$_2$)$_n$—COOH

[V] Diacetylene compounds:

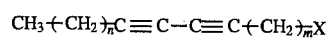

CH$_3$(CH$_2$)$_n$C≡C—C≡C(CH$_2$)$_m$X

0 ≦ n, m ≦ 20
(with proviso n + m > 10)

X is a hydrophilic group, and generally —COOH is used, but —OH, —CONH$_2$, etc. can be also used.

[VI] Others:

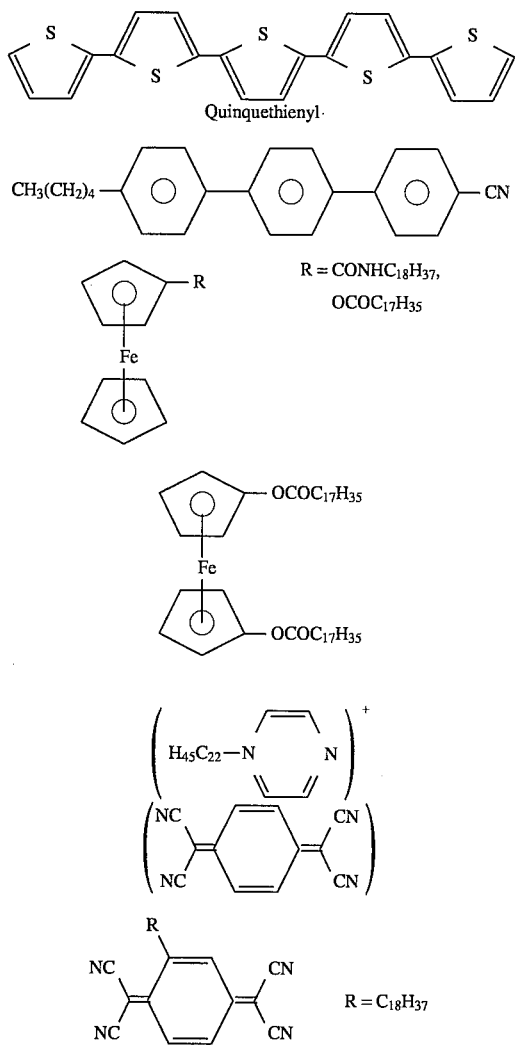

Dye materials suitable for the LB method other than those as mentioned above are of course suitable for the present invention. For example, biological materials of which study is becoming popular (e.g. bacteriorhodopsin or cytochrome c) or synthetic polypeptides (PBLG, etc.) and others may be also applicable.

Such amphiphilic molecule forms a monomolecular film with the hydrophilic group directed downward. The monomolecular layer on the water surface has the characteristics of the two-dimensional system. When the molecules are scattered sparsely, the following formula of the two-dimensional ideal gas is valid between the area per one molecule A and the surface pressure:

$$\pi A = kT,$$

thus becoming "gas film". Here, k is the Boltzmann's constant and T is an absolute temperature. When A is made sufficiently small, intermolecular interactions are strengthened, whereby the molecules become "condensed film (or solid film)" of a two-dimensional solid. The condensed film can be transferred, one layer by one layer, onto the surface of any desired body having various materials and shapes such as glass or resin. By use of this method, a monomolecular film or built-up films thereof can be prepared, and used as the recording layer.

As a specific preparation method, the following method may be employed.

Figure 7:
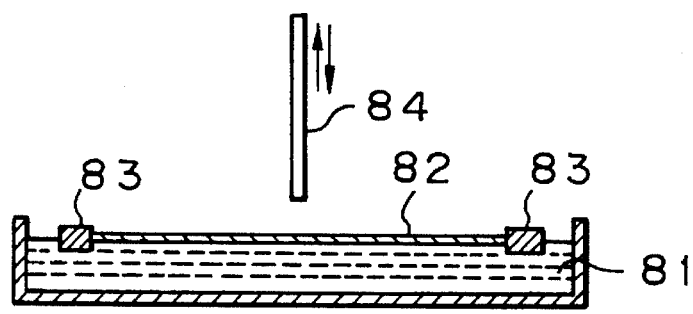
FIG. 7 is a schematic illustration of the device for forming built-up film.

A desired organic compound is dissolved in a solvent such as chloroform, benzene, acetonitrile, etc. Next, such solution is spread on an aqueous phase 81 by means of an appropriate device as shown in FIG. 7 in the accompanying drawings to form the organic compound in shape of a film.

Figure 8A:
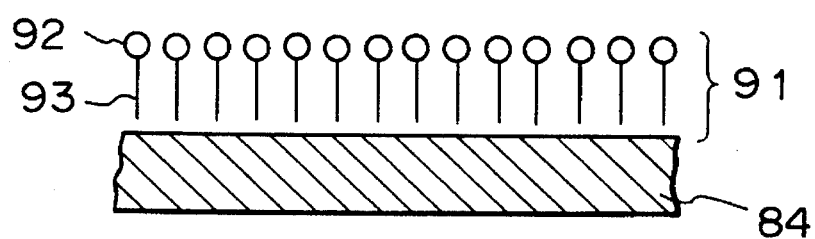
FIGS. 8A and 8B are schematic illustrations of a monomolecular film.

Subsequently, a partitioning plate (or a float) 83 is provided to prevent too broad expansion of the spreading layer 82 through free diffusion on the aqueous phase 81, whereby the spreading area of the spreading film 82 is restricted to control the gathered state of the film substance and obtain a surface pressure π in proportion to the gathered state. By moving this partitioning plate 83, the gathered state of the film substance can be controlled by reducing the spreading area, whereby the surface pressure can be gradually elevated to be set at a surface pressure suitable for preparation of the film. With the surface pressure kept constant, by moving vertically a clean substrate 84 gently, a monomolecular film of an organic compound is transferred onto the substrate 84. Such monomolecular film 91 is a film having molecules orderly arranged as shown in FIG. 8A or 8B.

The monomolecular film 91 can be thus produced, and a built-up film with desired built-up number can be formed by repeating the above operation. For transfer of the monomolecular film 91 onto the substrate 84, other than the above vertical dipping method, such methods as the horizontal lifting method, the rotating cylinder method, etc., may be employed. The horizontal lifting method is a method in which transfer is effected with the substrate being contacted horizontally on the water surface, and the rotating cylinder method is a method in which the monomolecular layer is transferred onto the substrate surface by rotating a cylindrical substrate on the water surface.

Figure 8B:
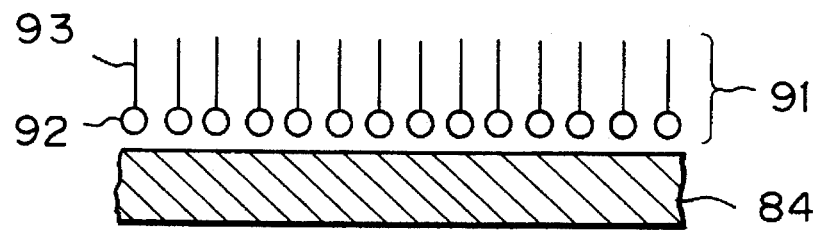
Figure 9A:
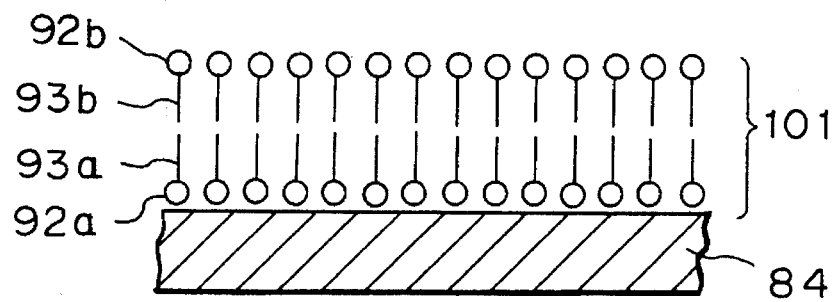
FIGS. 9A to 9C are schematic illustrations of a built-up film.
Figure 9B:
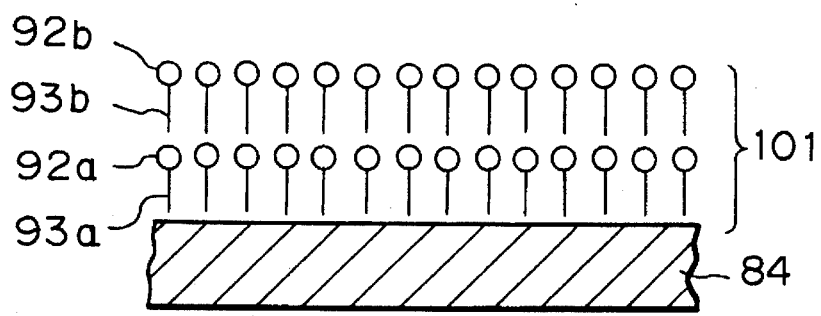
Figure 9C:
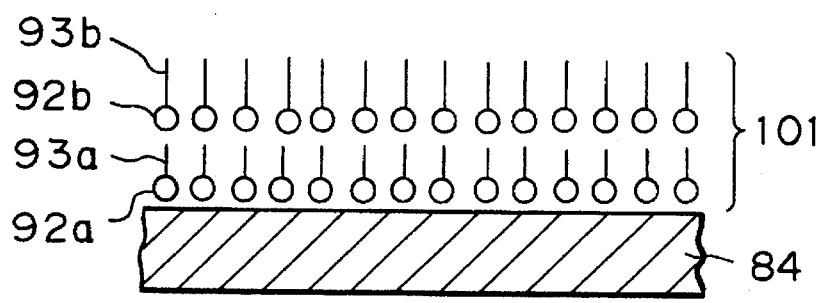

In the vertical dipping method as described above, when a substrate having a hydrophilic surface is withdrawn in the direction transversing the water surface, a monomolecular film 91 of the organic compound with the hydrophilic sites 92 of the organic compound directed toward the substrate 84 side is formed on the substrate 84 (FIG. 8B). When the substrate 84 is moved vertically, monomolecular films 91 are laminated one layer by one layer in the respective steps to form a built-up film 101. Since the direction of the film forming molecules in the withdrawing step becomes opposite to that of the dipping step, there is formed a Y type film according to this method in which the hydrophobic sites 93a and 93b of the organic compound are faced to each between the respective layers (FIG. 9A). In contrast, in the horizontal lifting method, the monomolecular film 91 is formed on the substrate 84 with the hydrophobic site 93 of the organic compound faced toward the substrate 84 side (FIG. 8A). According to this method, even when the monomolecular film 91 may be built up, there is no change in direction of the film forming molecules, but there is formed an X type film in which the hydrophobic sites 93a and 93b are faced toward the substrate side in all of the layers (FIG. 9B). On the contrary, a built-up film 101 in which the hydrophilic sites 92a and 92b are faced toward the substrate 84 side is called a Z type film (FIG. 9C).

The method for transferring the monomolecular film 91 onto a substrate 84 is not limited to the above methods, but it is also possible to employ a method in which a substrate is extruded into an aqueous phase from a roll, when employing a large area substrate. The direction of the hydrophilic groups and the hydrophobic groups toward the substrate as described above are given as a general rule, and it can also be modified by the surface treatment of the substrate, etc.

As described above, a potential barrier layer comprising the monomolecular film 91 of an organic compound or its built-up film is formed on the substrate 84.

In the present invention, the substrate 84 for supporting the thin film comprising a lamination of the inorganic material and organic material may be any of metal, glass, ceramics, plastic materials, etc., and further a biological material with remarkably lower heat resistance can also be used.

The substrate 84 as described above may be in any desired shape, preferably in a flat plate, which is not limitative of the present invention at all. This is because the above film forming method has such advantage that the film can be formed exactly in accordance with the shape of the substrate surface independently of the shape of the substrate surface.

In another specific example of the present invention, it is possible to utilize the phenomenon that tunnel current flows when the probe of a metal and an electroconductive substance are brought close to each other to a distance of about 1 nm with application of a voltage therebetween. This tunnel current depends on the work function on the surface, and therefore information regarding various surface electron states can be read.

The method by use of tunnel current has a number of advantages such that it requires no vacuum condition, is applicable to both single crystalline and amorphous materials, has high resolving power, and yet reproduction at low power is possible without giving damage by the current.

Further, since tunnel current is of a magnitude on the order of about nA, the recording medium may be one having a conductivity of $10^{-10}$ (ohm.cm)$^{-1}$ or higher, preferably $10^{-8}$ (ohm.cm)$^{-1}$ or higher.

As the recording medium to be used in the present invention, materials exhibiting the memory switching phenomenon in current-voltage characteristic can be utilized. For example, there may be included (1) amorphous semiconductors such as oxide glass, borate glass or chalcogenide glass containing Se, Te, as compounded with the element of the group III, IV, V or VI of the periodic table, etc. They are intrinsic semiconductors having an optical band gap Eg of 0.6 to 1.4 eV or an electrical activation energy $\Delta E$ of approximately 0.7 to 1.6 eV. Specific examples of chalcogenide glass may include A-Se-Te type, Ge-As-Se type, Si-Ge-As-Te type, for example, $Si_{16}Ge_{14}As_5Te_{65}$ (the subscripts show atomics), or Ge-Te-X type, Si-Te-X type (X=represents small amount of group V, and VI elements), for example $Ge_{15}Te_{81}Sb_2S_2$.

Further, a chalcogenide glass of Ge-Sb-Se type may be also used.

In the amorphous semiconductor layer comprising the above compound deposited on the electrode, by applying a voltage in the direction vertical to the film surface by use of a probe electrode, the electric memory effect of the medium can be exhibited.

As the method for depositing such material, the object of the present invention can be sufficiently accomplished according to the thin-film-forming technique known in the art. For example, suitable film-forming methods may include the vacuum vapor deposition method, the cluster ion beam method, etc. Generally speaking, the electric memory effect of such material is observed at a film thickness of several μm or less, and concerning recording resolving power as the recording medium, the thickness may be preferably thinner. However, with respect to uniformity and recording characteristic, a film thickness is preferably 100 Å to 1 μm more preferably a thickness of 1000 Å or less.

Further, there may be included (2) organic semiconductor layers having deposited a salt of an electron accepting compound such as tetraquinodimethane (TCNQ), TCNQ derivatives, for example, tetrafluorotetracyanoquinodimethane (TCNQF$_4$), tetracyanoethylene (TCNE) and tetracyanonaphthoquinodimethane (TNAP), etc. with a metal having relatively lower reduction potential such as copper or silver on the electrode.

As the method for forming such organic semiconductor layer, there may be employed the method in which the above electron accepting compound is vacuum vapor deposited on the electrode of copper or silver.

The electric memory effect of such organic semiconductor is observed at a film thickness of several ten μm or less, but a film thickness of 100 Å to 1 μm is preferred with respect to film forming property and uniformity.

Further, there may be employed (3) recording medium using amorphous silicon as the material. For example, it is a recording medium having a layer constitution of metal/a-St (p$^+$ layer/n layer/i layer) or metal/a-Si (n$^+$ layer/p layer/i layer), and the respective layers of a-Si can be deposited satisfactorily according to the methods known in the art. In the present invention, the glow discharge method (GD) may be preferably employed. The film thickness of a-Si may be preferably 2000 Å to 8000 Å for the n layer, about 1000 Å for the p$^+$ layer, with the total film thickness being preferably about 0.5 μm to 1 μm.

On the other hand, the electrode material to be used in the present invention may be one having high conductivity, including a large number of materials, typically metals such as Au, Pt, Ag, Pd, Al, In, Sn, Pb, W, etc. and alloys of these, further graphite or silicide, and further electroconductive oxides such as ITO, and application of these materials for the present invention may be contemplated. The method for forming electrode by use of such material may be sufficiently the known thin film forming technique. However, as the electrode material to be formed directly on the substrate, it is preferable to use an electroconductive material of which the surface will not form an insulating oxide film during formation of an LB film, for example a noble metal or an oxide conductor such as ITO.

The metal electrode of the recording medium is required if the recording later in the present invention is insulating, but no such metal electrode is required if said recording layer exhibits semiconductive properties of MΩ or less. Thus, the recording layer itself can be used as the counter-electrode of the probe electrode.

Also, the tip of the probe electrode is required to be pointed so far as possible in order to enhance resolving power of recording/reproduction/erasing. In the present invention, a platinum with a thickness of 1 mm in diameter with a tip mechanically grounded to a cone of 90°, which is subjected to evaporation of the surface atoms by applying an electrical field in ultra-high vacuum, is employed, but the shape of the probe and the treating method are not limited thereto.

Figure 4:
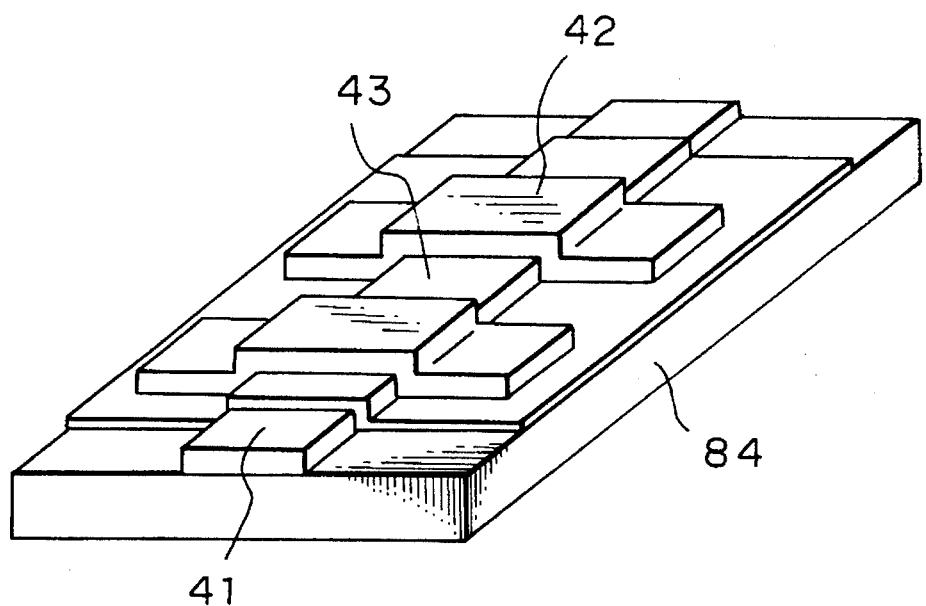
FIG. 4 is a schematic illustration of MIM device.
Figure 6:
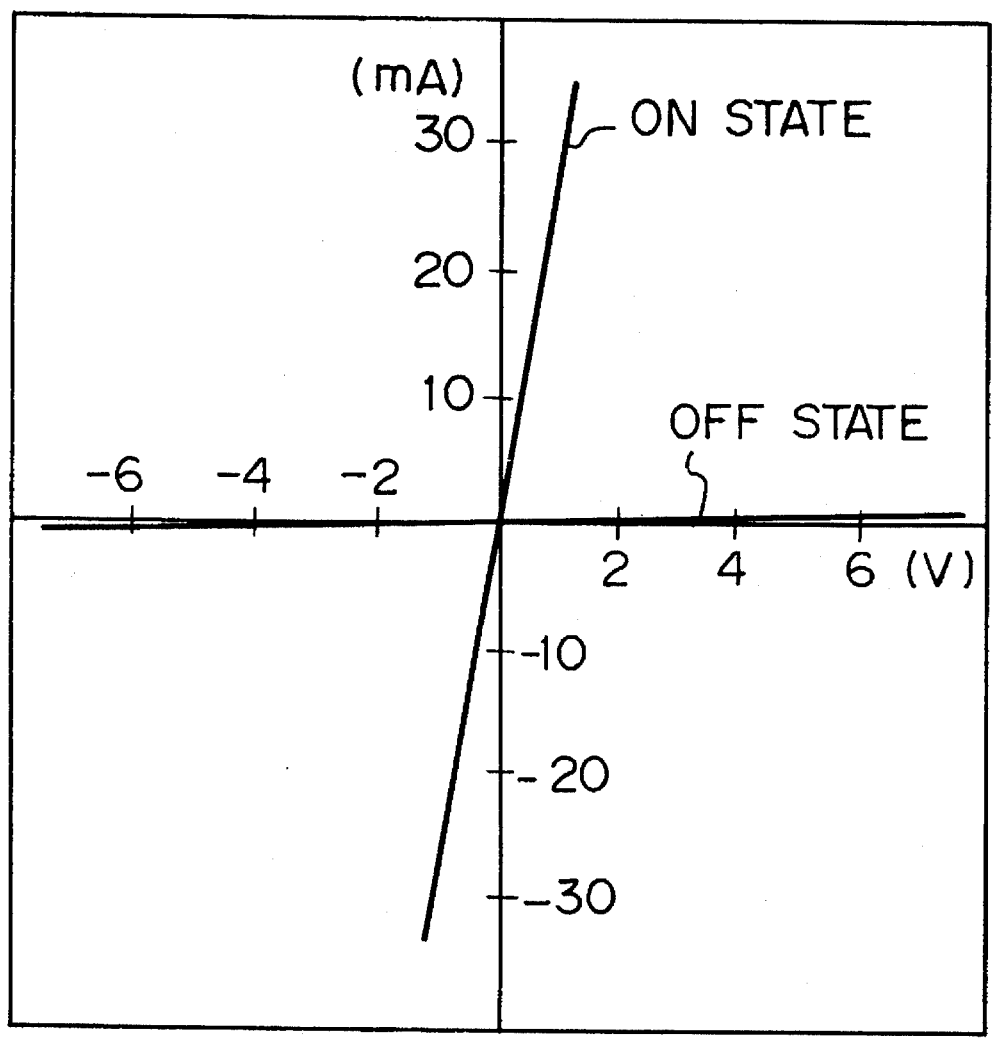

By use of the materials and the method as described above, a device with MIM structure as shown in FIG. 4 was prepared, whereby a memory switching device exhibiting the current-voltage characteristics as shown in FIG. 8 and FIG. 6 was obtained, and the two states (ON state and OFF state) were already found to have respective memory characteristics. These memory switching characteristics appear at the layer thickness of several Å to several 1000 Å, but the recording medium used with the probe electrode of the present invention should preferably have a layer thickness in the range of several Å to 500 Å, most preferably a layer thickness of 10 Å to 200 Å.

In FIG. 4, 84 represents a substrate, 41 an Au electrode, 42 an Al electrode and 43 a built-up monomolecular film as described above.

FIG. 1 is a block constituting diagram showing the recording device of the present invention. In FIG. 1, 105 is a probe current amplifier, 106 a servo circuit for controlling the fine mechanism 107 by use of a piezoelectric element so that the probe current may become constant. 108 is a power source for applying a pulse voltage for recording/erasing between the probe electrode 102 and the electrode 103.

When a pulse voltage is applied, the probe current will be abruptly changed and therefore the servo circuit 106 controls the HOLD circuit to be set ON so that the output voltage may be kept constant during that period.

109 is an XY scanning driving circuit for movement control of the probe electrode in the XY direction. 110 and 111 are used for coarse control of the distance between the probe electrode 102 and the recording medium 1 so that a probe current of about $10^{-9}$ A may be obtained. These respective instruments are under the central control by means of a microcomputer 112. Also, 113 has a display instrument.

The mechanical performances in the movement control by use of a piezoelectric element are shown below.

Fine control range in Z direction:
0.1 nm - 1 μm
Coarse control range in Z direction:
10 nm - 10 mm
Scanning range in XY direction:
0.1 nm - 1 μm
Measurement, control tolerable error:
<0.1 nm.

Figure 10A:
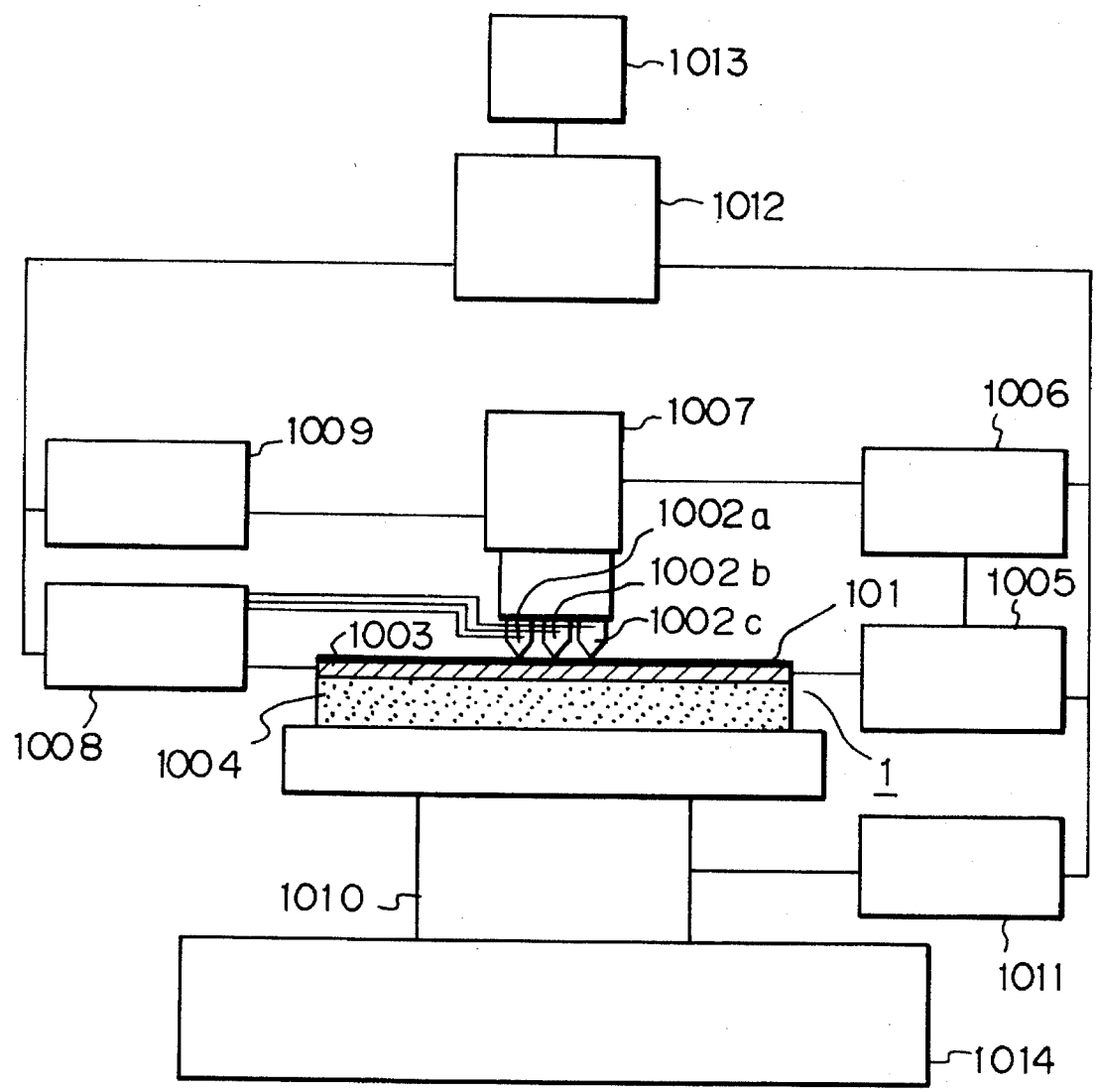
FIG. 10A illustrates diagramatically the current passage recording and reproducing device of the present invention.

FIG. 10A is a block constituting diagram showing another recording device of the present invention. In FIG. 10A, 1005 is a probe current amplifier, and 1006 is a servo circuit for controlling the fine mechanism 1007 by use of a piezoelectric element so that the probe current may become constant. 1008 is a power source for applying a pulse voltage for recording/erasing between the probe electrodes 1002a, b, c and the electrode 1003.

When a pulse voltage is applied, the probe current will be abruptly changed, and therefore the servo circuit 1006 controls the HOLD circuit to be set ON so that the output voltage may be kept constant during that period.

1009 is an XY scanning driving circuit for movement control of the probe electrodes 1001a, b, c in the XY direction. 1010 and 1011 are used for coarse control of the distance between the probe electrodes 1002a, b, c and the recording medium 1 so that a probe current of about 10-9 A may be previously obtained. These respective instruments are all under central control by means of a microcomputer 1012. 1013 represents a display instrument, and 1015 a wiring.

Also, the mechanical performances in the movement control by use of a piezoelectric element are shown below.
Fine control range in Z direction:
0.1 nm - 1 μm
Coarse control range in Z direction:
10 nm - 10 mm
Scanning range in XY direction:
0.1 nm - 1 μm
Measurement, control tolerable error:
<0.1 nm.

Figure 10B:
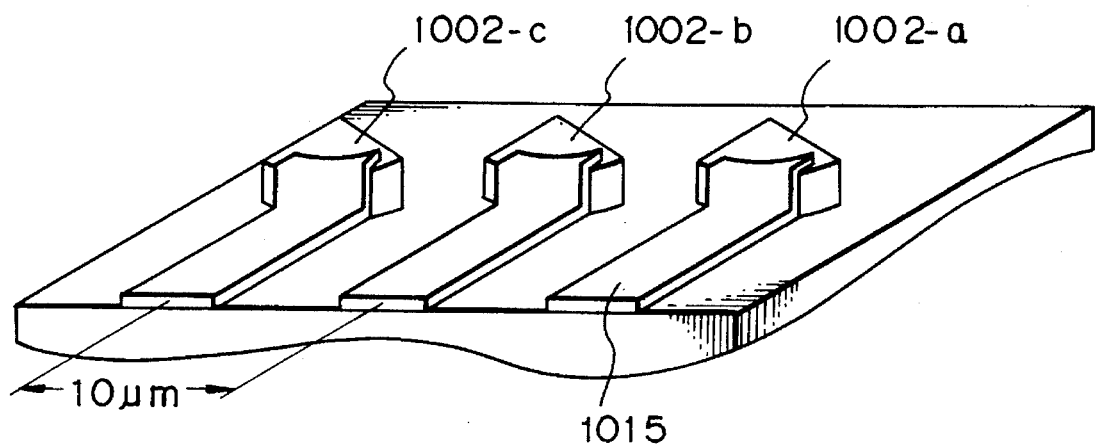
FIG. 10B is a perspective view of a substrate on which a plural number of probes were provided.
Figure 10C:
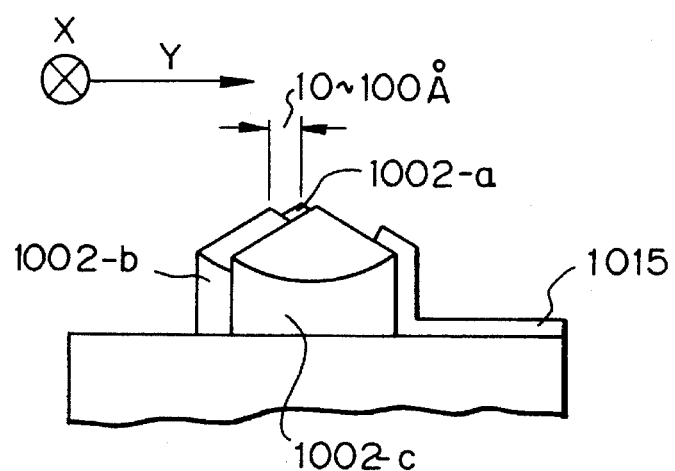
FIG. 10C is a side view thereof.
Figure 10:
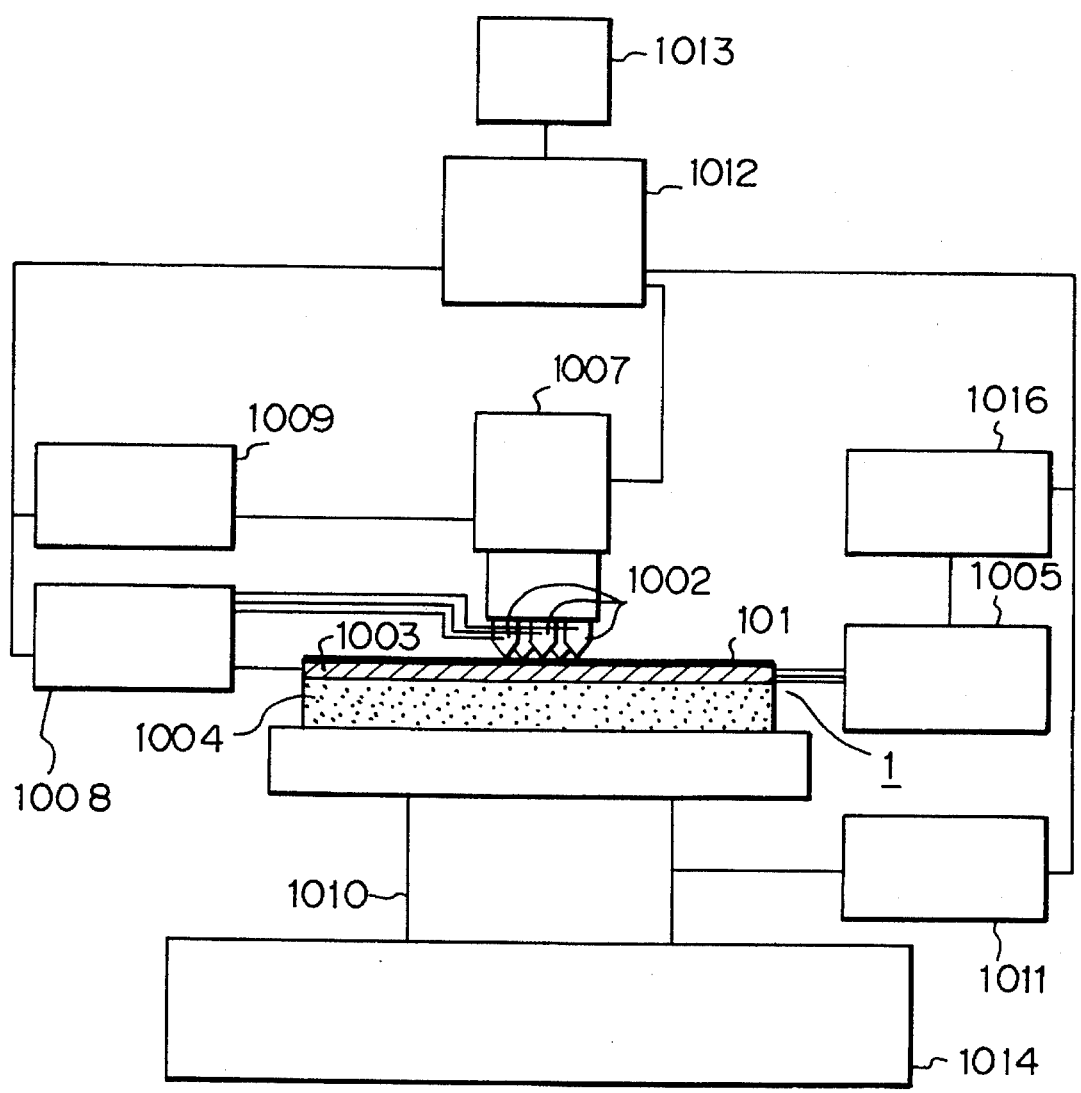
FIG. 10D illustrates diagramatically another current passage recording and reproducing device of the present invention.
FIG. 10E is a perspective view of a substrate on which a plural number of probes are provided.
FIG. 10F is a side view thereof.
Figure 10E:
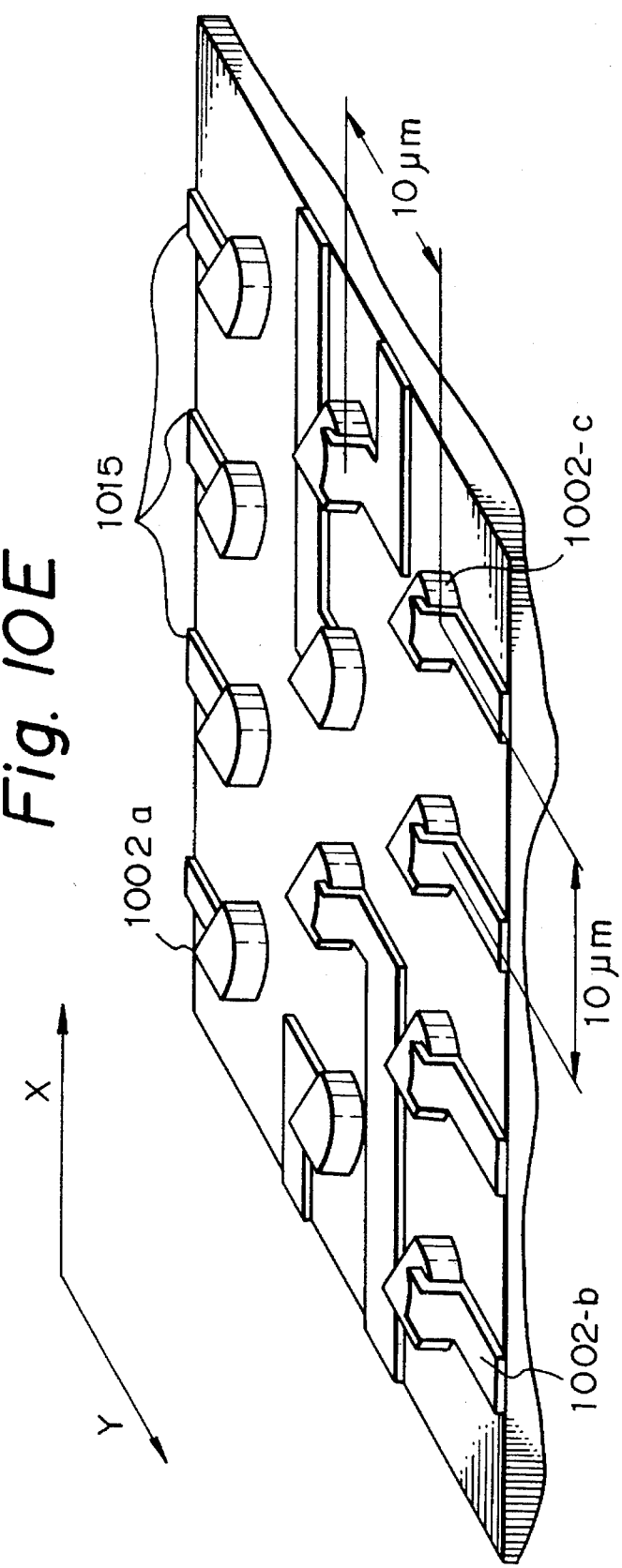
Figure 10F:
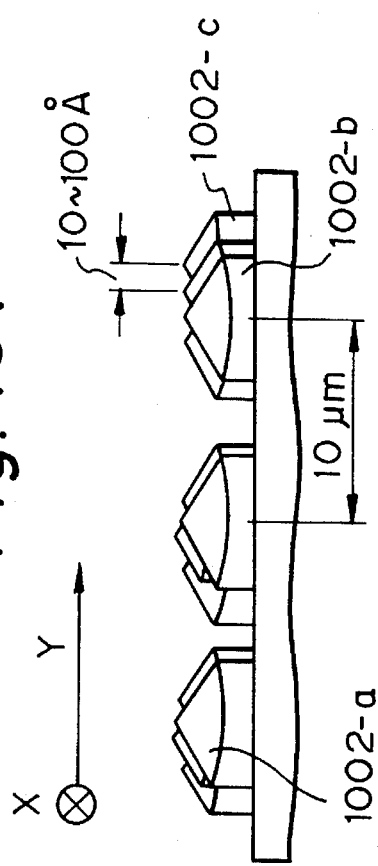

FIG. 10D is another preferable example of the present invention, showing a block diagram of the device having a large number of probe electrodes 1002 provided, FIG. 10E showing a perspective view of an embodiment in which a number of probe electrodes 1002 are provided on the $SiO_2$ substrate and FIG. 10F showing a side view thereof.

The probe electrodes shown in FIGS. 10D–10E can be prepared in a large number by implanting silicon onto the $SiO_2$ plate by focus-ion beam and permitting tungsten to grow selectively on the silicon. In the device shown in FIG. 10D, in place of the servo circuit 1006 used in the device shown in FIG. 10A, an A/D transducer 1016 for converting analog signals obtained to digital signals can be used.

In another preferable example of the present invention, a high density record written by use of an energy beam such as a particle beam (an electron beam, or an ion beam) or a higher energy electromagnetic wave ray such as an X-way, etc. and visible light, an UV-ray or a laser beam, etc. can be electrically reproduced by use of a probe electrode. As a reproducing device, the device shown in FIG. 1 and FIG. 10 can be used. In this case, the recording medium 1 to be used is constituted of a substrate electrode 103 and a recording layer 101 formed thereon.

As the recording layer 101 mentioned above, an inorganic or organic semiconductive substance can be used.

For example, inorganic semiconductors may include semiconductive substances containing the element selected from the group IVB of the long period type periodic table (C, Si, Ge), semiconductive substances containing the element selected from the group IIIB (Ga) and the element selected from the group VB (As, P) or semiconductive substances containing the element selected from the group IIB (Zn, Cd) and the element selected from the group VIB (O, S, Se). Specifically, there may be employed a large number of materials, including typically semiconductors such as Si (single crystalline, polysilicon, amorphous), Ge, GaAs, GaP, InAs, InP or CdS, CdSe, ZnO, ZnS, etc. On the other hand, organic semiconductors may include a large number of organic semiconductors, for example, aromatic polycyclic compounds such as phthalocyanine and derivatives thereof, pyrene, perylene, etc. and derivatives thereof; polymeric compounds having conjugated π bond such as polyacetylene, polydiacetylene derivatives, etc.; further electrolytic polymerized films such as of pyrrole, thiophene, etc.; or polyvinyl carbazole, tetraquinodimethane, docosylpyridinium, tetraquinodimethane charge transfer complexes, etc.

These semiconductor substances can be formed in conventional manner into thin films. For example, for film formation of an inorganic semiconductor, there can be employed the vacuum vapor deposition method, the sputtering method, the glow discharge method, etc., while for film formation of an organic semiconductor, the vacuum vapor deposition method such as the cluster ion beam method or the electrolytic polymerization method may be available. Also, film formation can be effected by coating of a coating liquid having a semiconductive substance dispersed in an appropriate resin (e.g. polystyrene, polyacrylonitrile, polycarbonate, polyester, etc. according to a conventional method (roll coating, dip coating, etc.).

Also, in another specific example of the present invention, during formation of the recording layer 101, a Langumuir-Blodgett method (an LB method) proposed by Langmuir et al as described above is applicable.

As the general structure of molecule to be used in the present invention, the molecules as shown below may be included.

(1) Molecules with the site bearing desired function, namely the functional moiety (e.g. π electron system) having at the same time strong hydrophilic property (or strong hydrophobic property) in combination, for example, copper phthalocyanine, pyrene, trtphenylmethane, etc., or molecules with such functional moiety exhibiting polymerizability, for example, diacetylene derivatives, polyimide, etc.

(2) Molecules with the functional moiety having not particularly hydrophilic property or hydrophobic property and having hydrophilic sites and hydrophobic sites formed within the molecule by introducing hydrophilic groups, and hydrophobic groups as described above, including, for example:

a) those having functional moieties arranged on the side of hydrophilic sites, for example, long chain alkyl-substituted melocyanine dyes having photo-conductivity, etc.;

b) those having functional moieties arranged on the side of hydrophobic sites, for example, pyrene having long chain alkylcarboxylic acid bonded thereto;

c) those having functional moieties arranged around the center, namely in the middle of the hydrophobic sites and the hydrophilic sites, for example, anthracene derivatives, diazo dyes, etc.

d) those having no functional moiety, but constituting of only hydrophobic sites and hydrophilic sites, for example, stearic acid, arachidic acid, etc. substituted with long chain saturated fatty acid.

Other materials suitable for the LB method than those mentioned above are of course suitable for the present invention. For example, biological materials of which studies have been comprehensively made in recent years (e.g. polypeptides such as bacteriorhodopsin or cytochrome c) or synthetic polypeptides (PBLG, etc.) may be also applicable.

A potential barrier layer comprising a monomolecular film of such organic compound or its built-up film is formed on the substrate.

In the present invention, the substrate for supporting the thin film comprising a laminate of inorganic and organic materials as described above may be any of metal, glass, ceramics, plastic materials, etc., and further a biological material with remarkably lower heat resistance can be also used.

The substrate as mentioned above may have any desired shape, preferably a flat plate shape, but the shape is not limited to a flat plate at all. Thus, in the above film forming method, irrespectively of whether the substrate may have any surface shape, there is the advantage that the film can be formed exactly the same as its shape.

The recording layer 101 can be recorded with various energy beams as described below, and the recorded image can be reproduced by means of the reproducing means as described above. In the following, specific examples of the recording method are shown.

1) A method in which a high energy particle beam such as electron beam, ion beam is irradiated on the LB film as described above. By irradiation of a high energy particle beam onto an LB film, there occurs physical change in the film structure of the LB film itself, whereby the change in the film thickness of the LB film is caused to occur.

2) A method in which an ion beam, visible light or an UV-ray is irradiated onto the semiconductor thin film, whereby the change in electroconductivity is caused to occur at the irradiated portion.

3) A method in which electron beam is irradiated onto a thin film of a metal phthalocyanine (copper phthalocyanine, nickel phthalocyanine, lead phthalocyanine, etc.), thereby causing the oxidation-reduction reaction of the metal phthalocynine at the irradiated portion to occur, to cause change in the film structure.

4) A method in which change in electron state accompanied with polymerization by electron beam, X-ray or UV-ray irradiation is caused to occur. The monomers to be used in this case may include the following:

ⓐ 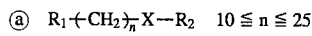 $R_1 + CH_2 \frac{}{n} X - R_2 \quad 10 \leq n \leq 25$

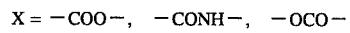 $X = -COO-, \quad -CONH-, \quad -OCO-$

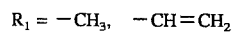 $R_1 = -CH_3, \quad -CH=CH_2$

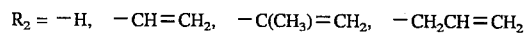 $R_2 = -H, \quad -CH=CH_2, \quad -C(CH_3)=CH_2, \quad -CH_2CH=CH_2$ (with proviso that $R_2$ cannot be $-H$ where $R_1$ is $-CH_3$)

ⓑ $H + CH_2 \frac{}{n} C \equiv CC - C \equiv C + CH_2 \frac{}{m} X - R_2$ $0 \leq m, n, \quad 10 \leq m+n \leq 25$

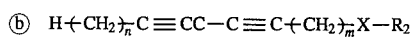 $X = -COO, \quad -CONH-, \quad -OCO-$

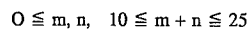 
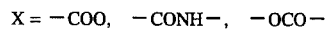 
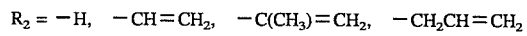 $R_2 = -H, \quad -CH=CH_2, \quad -C(CH_3)=CH_2, \quad -CH_2CH=CH_2$ 5) The method in which direct recording is effected through change in conformation or configuration of the compound by irradiation of visible light or UV-ray. For example, there may be employed:

a) spiropyrane, fulgide or azobenzene derivatives having photochromic property;

b) dyes in which the associated state is changed, for example, melocyantne compounds, cyanine compound, or squatilium and croconic methine compounds, particularly azulene type compounds.

The thin film structure change of an LB film, etc. as mentioned here may sometimes occur alone, but in many cases some effects will generally occur associatedly.

As the electrode for laminating a thin film such as an LB film, etc. as described above, all conductors having conductivity of 10-6 (ohm.cm)-1 or higher can be used. More specifically, with the use of a metal plate such as Au, Pt, Pd, AG, Al, or a glass, ceramics, plastic materials having these metals vapor deposited thereon, or semiconductors such as Si (crystalline, amorphous) as the substrate, a thin film such as LB film can be laminated thereon and used as the recording medium.

EXAMPLE 1

A recording/reproducing device shown in FIG. 1 was employed. As the probe electrode 102, a probe electrode made of platinum was used. This probe electrode 102 is used for controlling the distance (Z) from the surface of the recording layer 101, and its distance (Z) is finely controlled by a piezoelectric element so that the current may be controlled to be constant. Further, the fine control mechanism 107 is designed so that fine movement control may be possible also in the plane (X,Y) direction. However, all of these are known techniques. Also, the probe electrode 102 can be used for direct recording, regeneration and erasing. The recording medium is placed on the XY stage 114 with high precision and can be moved to any desired position.

Next, the experiments of recording, reproduction and erasing by use of an LB film (8 layers) of squarilium-bis- 6-octylazulene (hereinafter abbreviated as SOAZ) formed on the electrode 103 formed of Au are described in detail.

Figure 2:
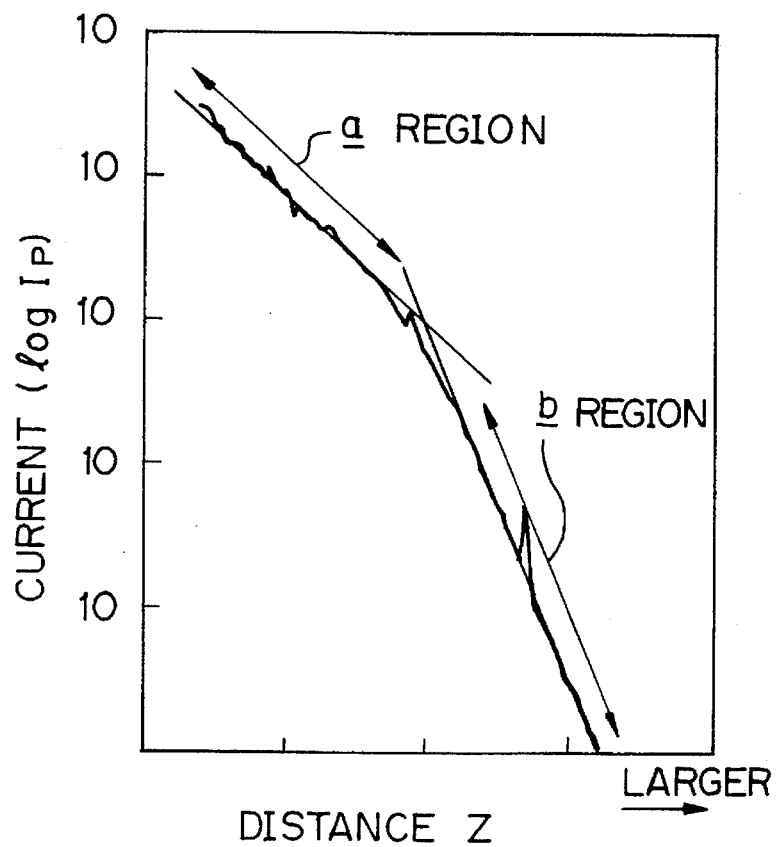
FIG. 2 illustrates the characteristic curve of the current passed when 1 V is applied on the probe electrode when the distance between the probe electrode and the sample (recording layer) is varied.

A recording medium 1 having a recording layer with 8 built-up SOAZ layers was placed on the XY stage 114, and first the position of the probe electrode 102 was determined and fixed firmly. Between the Au electrode (the ground side) 103 and the probe electrode 102, a voltage of −3.0 V was applied, and the distance (Z) between the probe electrode 102 and the recording layer 101 surface was controlled while monitoring the current. Thereafter, the distance from the probe electrode 102 to the surface of the recording layer 101 was changed by controlling the fine control mechanism 107, whereby the current characteristics as shown in FIG. 2 were obtained. It is required that the probe voltage should be controlled so that the probe current Ip for controlling the distance from the probe electrode 102 to the surface of the recording layer 101 may be $10^{-7}A > Ip > 10^{-12}A$, preferably $10^{-8}A > Ip > 10^{-10}A$.

First, the controlled current was set to be current value of the a region in FIG. 2 ($10^{-7}A$)—(Condition of probe grounding). When the current value was measured by applying reading voltage of 1.5 V which was a voltage not exceeding the threshold voltage which gives rise to electric memory effect between the probe electrode 102 and the Au electrode 103, OFF state was exhibited at μA or less. Next, after a triangular pulse voltage having the waveform shown in FIG. 3 which is an voltage of or higher than the threshold voltage of Vth ON which gives rise to ON state, the current was again measured by applying a voltage of 1.5 V between the electrodes, whereby a current of about 0.7 mA was found to flow, thus indicating the ON state.

Next, after as triangular pulse voltage with a peak voltage of 5 V and a pulse width of 1 μS which is a voltage of or higher than the threshold voltage Vth OFF at which the change occurs from the ON state to the OFF state, 1.5 V was again applied, whereby it was confirmed that the current value at this time was reterned to OFF state at μA or less.

Next, with the probe current Ip being set at $10^{-9}$ A (b region in FIG. 2), the distance Z between the probe electrode 102 and the surface of the recording layer 101 was controlled.

Figure 3:
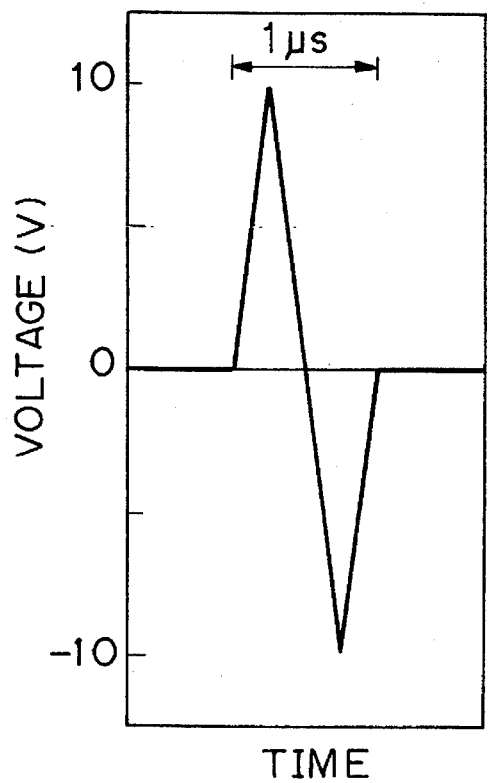
FIG. 3 illustrates the pulse voltage waveform for recording.

While moving the XY stage 114 at a constant interval (1 μ), a pulse voltage (15 Vmax, 1 μS) of ON or higher than the threshold value Vth ON having the same waveform as in FIG. 3 was applied to write the ON state. Then, by applying a probe voltage of 1.5 V for reading between the probe electrode 102 and the counter-electrode 103, the change in current quantity passing between the ON state region and OFF state region can be directly read or through the servo circuit 106. In this Example, it was confirmed that the probe current passing through the ON state region was found to be changed by 3 digits or more as compared with before recording (or the OFF state region).

Further, as the result of tracing again the recording position by setting the probe voltage at 10 V of the threshold voltage Vth OFF or higher, it was also confirmed that all the recorded state was erased to be transited to the OFF state.

Next, by use of the fine control mechanism 107, the resolving power was measured by writing stripes of 1 μ length with various pitches between 0.001 μ and 0.1 μ, and it was found to be 0.01 μ or less.

The SOAZ-LB film used in the above experiments was prepared as described below.

After an optically polished glass substrate (substrate 104) was washed by use of a neutral detergent and Trichlene, Cr was deposited as the subbing layer by the vacuum deposition method to a thickness of 50 Å, and further Au was vapor deposited by the same method to 400 Å to form a subbing electrode (Au electrode 103).

Next, a chloroform solution containing SOAZ dissolved at a concentration of 0.2 mg/ml was spread over an aqueous phase of 20° C. to form a monomolecular film on the water surface. After evaporation of the solvent, the surface pressure of such monomolecular film was enhanced to 20 mN/m, and further while this was maintained to be constant, the above electrode substrate was dipped gently at a speed of 5 mm/min. So as to transverse across the water surface, and further withdrawn to have two layers of Y-form monomolecular film built up. By repeating appropriate times of this operation, 6 kinds of 2, 4, 8, 12, 20 and 30 layers of built-up films were formed on the above substrate and used for recording and reproducing experiments. The evaluation results are shown in Table 1.

Evaluation was performed overall from the recording and erasing characteristics after applying the pulse and the erasing voltage, further the ratio of the current value under the recording state to that of the erased state (ON/OFF) and the resolving ability, and those with particularly good results were rated as A, those with excellent results as B, and those with relatively somewhat lower results as compared with others as C.

EXAMPLE 2

The experiments were conducted in the same manner as in Example 1 except for using t-butyl derivative of luthetium diphthalocyanine [LuH(pc)$_2$] in place of the SOAZ recording medium used in Example 1. The results are summarized in Table 1. It was found that writing and reading of record could be done at sufficient S/N ratio as in the case of SOAZ.

The built-up conditions of t-butyl derivative of LuH(Pc)$_2$ are shown below.

Solvent: chloroform/trimethylbenzene/acetone (1/1/2)

Concentration: 0.5 mg/ml

Aqueous phase: pure water, water temperature 20° C.

Surface pressure: 20 mN/m, vertical moving speed of substrate 3 mm/min.

EXAMPLES 3–9

Recording media were prepared by use of the substrate electrode materials and the dye compounds shown in Table 2, and the same experiments as in Examples 1 and 2 were conducted with the controlled current value of the probe current set at $10^{-9}$ A to obtain the results shown in Table 2. As shown by the mark B in the Table, recording and reproduction could be done at sufficient resolving power and ON/OFF ratio for all of the samples.

The built-up number of the dye LB film was all two layers. Also, the Pt electrode was vapor deposited by use of the EB method, and ITO by the sputtering method, respectively.

TABLE 1

| Organic Compound | Built-up Number | a Region | | | b Region | | | Resolving Power |
|---|---|---|---|---|---|---|---|---|
| | | Recording Characteristic | ON/OFF Ratio | Erasability | Recording Characteristic | ON/OFF Ratio | Erasability | |
| SOAZ | 2 | A | B | A | A | A | A | Not more than 0.01μ |
| | 4 | A | B | A | A | A | A | " |
| | 8 | A | A | A | A | A | A | " |
| | 12 | A | A | A | A | A | A | " |
| | 20 | B | A | A | B | A | A | Not more than 0.1μ |
| | 30 | B | A | A | C | A | A | " |
| LuH(Pc)$_2$ | 2 | A | C | A | A | B | A | Not more than 0.03μ |
| | 4 | A | B | A | A | A | A | " |
| | 8 | A | B | A | A | A | A | " |
| | 12 | A | A | A | A | A | A | " |
| | 20 | B | A | A | C | A | A | Not more than 0.1μ |
| | 30 | C | A | A | C | A | A | " |

TABLE 2

| Example | Substrate Electrode | Dye Compound | Recording Reproducibility | Resolving Power |
|---|---|---|---|---|
| 3 | Pt (100 Å) | SOAZ | ○ | Not more than 0.01μ |
| 5 | Cr/Au (50 Å/400 Å) | Tetraphenylporphyrine derivative* | ○ | Not more than 0.05μ |
| 4 | ITO (1000 Å) | SOAZ | ○ | Not more than 0.03μ |
| 6 | Cr/Au (50 Å/400 Å) | Anthracene derivative** | ○ | Not more than 0.1μ |
| 7 | Cr/Au (50 Å/400 Å) | Docosylpyradinium-tetracyanoquinodimethane | ○ | Not more than 0.01μ |
| 8 | Cr/Au (50 Å/400 Å) | Pentacosa-10,12-diynoic acid | ○ | Not more than 0.01μ |
| 9 | Cr/Ar (50 Å/400 Å) | Bacteriorhodopsin*** | ○ | Not more than 0.05μ |

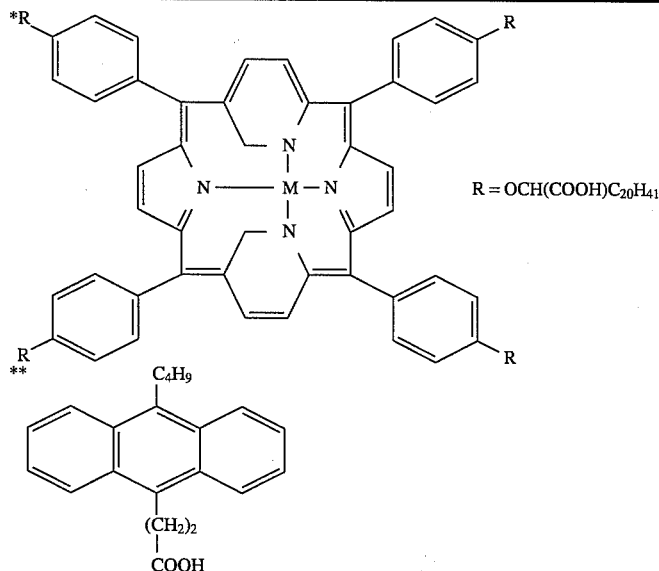

*  R = OCH(COOH)C$_{20}$H$_{41}$

***violet film extracted from a cultured product obtained by culturing a highly halophilic bacterium according to the known method.

In the Examples as described above, the LB method was employed for formation of the dye recording layer, but any film forming method can be used without limitation to the LB method, provided that an extremely thin film can be prepared, and specifically the vacuum vapor deposition method such as MBE, CVD method, etc. may be included.

Applicable materials are not limited to only organic compounds, but inorganic materials such as chalcogenide compounds, etc. are also applicable.

Further, it is also possible to use an integration of the electrode and the recording layer by use of a semiconductor as the electrode on the recording medium side.

The present invention is not limitive of the substrate material, its shape and surface structure at all.

EXAMPLE 10

A recording/reproducing device shown in FIG. 1 was employed. As the probe electrode 102, a probe electrode made of platinum was used. This probe electrode 102 is used for controlling the distance (Z) from the surface of the recording layer 101, and its distance (Z) is finely controlled by a piezoelectric element so that the current may be controlled to be constant. Further, the fine control mechanism 107 is designed so that fine control may be possible also in the plane (X,Y) direction. However, all of these are known techniques. Also, the probe electrode 102 can be used for direct recording, regeneration and erasing. The recording medium is placed on the XY stage 114 with high precision and can be moved to any desired position.

Next, the experiments of recording, reproduction and erasing by use of a chalcogenide glass represented by the composition formula $Si_{16}Ge_{14}As_5Te_{65}$ (the subscriptions correspond to atomic %) (film thickness 2000 Å) formed on the electrode 103 formed of Au are described in detail.

A recording medium 1 having a recording layer 101 of the above chalcogenide glass having a thickness of 2000 Å was placed on the XY stage 114. Between the Au electrode (the ground side) 103 and the probe electrode 102, a voltage of 1.0 V was applied, and the distance (Z) between the probe electrode 102 and the recording layer 101 surface was controlled while monitoring the current. Thereafter, the fine control mechanism 107 was controlled so that the probe current Ip became $10^{-9}$ A.

It is required that the probe voltage should be controlled so that the probe current Ip for controlling the distance from the probe electrode 102 to the surface of the recording layer 101 may be $10^{-7}A>Ip>10^{-12}A$, preferably $10^{-8}A>Ip>10^{-10}A$.

While moving the XY stage 114 at a constant interval (1 μ), a rectangular pulse voltage (20 Vmax, 0.1 μS) of or higher than the threshold value Vth ON was applied to give rise to a low resistance state (ON state). Then, by applying a probe voltage of 1.0 V for reading between the probe electrode 102 and the counter-electrode 103, the change in current quantity passing between the ON state region and OFF state region can be directly read or through the servo circuit 106. In this Example, it was confirmed that the probe current passing through the ON state region was found to be changed by 2 digits or more as compared with before recording (or the OFF state region).

Further, as the result of tracing again the recording position while applying a rectangular pulse voltage (50 Vmax, 10 μS) of or higher than the threshold voltage Vth OFF on the probe electrode, it was also confirmed that all the recorded state was erased to be transited to the OFF state. Erasing of recording is also possible by the optical method.

Next, by use of the fine control mechanism 107, the resolving power was measured by writing stripes of 1 μ length with various pitches between 0.01 μ and 1 μ, and it was found to be 0.1 μ or less.

The chalcogenide glass used in the above experiments was prepared as described below.

After an optically polished glass substrate (substrate 104) was washed by use of a neutral detergent and Trichlene, Cr was deposited as the subbing layer by the vacuum deposition method to a thickness of 50 Å, and further Au was vapor deposited by the same method to 400 Å to form a subbing electrode (Au electrode 103).

Next, an amorphous semiconductor represented by the atomic composition ratio of $Si_{16}Ge_{14}As_5Te_{65}$ was vapor deposited to a film thickness of 2000 Å by the vacuum vapor deposition method known in the art and used as the recording medium.

EXAMPLE 11

The same experiment as in Example 10 was conducted except for using $Ge_{15}Te_{81}Sb_2S_2$ in place of $Si_{16}Ge_{14}As_5Te_{65}$ used in Example 10. It was found that writing and reading of record could be done at sufficient S/N ratio similarly as in Example 1.

EXAMPLE 12

The same recording and reproducing experiment as in Example 1, except for using $GuTCNQF_4$ in place of the chalcogenide glass recording medium used in Examples 10 and 11. A rectangular pulse of 2 Vmax, 10 ns was used as the application voltage for recording, and the application voltage for control of the probe current was made 0.1 V. As the result, recording and reproduction could be done at sufficient S/N ratio similarly as in Example 1. The method for preparation of the $CuTCNQF_4$ recording medium is described below.

After an optically polished glass substrate was washed, Cu was deposited to 2000 Å according to the vacuum vapor deposition method to provide an electrode. Further, Cu and $TCNQF_4$ were co-deposited by the vacuum vapor deposition method to deposit a $Cu-TCNQF_4$ layer to 2000 Å (substrate temperature; room temperature). At this time, heating was effected by passing current value previously set so that the vapor deposition speed may become about Cu, 5 Å/s; $TCNQF_4$, 20 Å/s. As the result, it was confirmed that a blue film by formation of $CuTCNQF_4$ was deposited.

EXAMPLE 13

After an electrode was formed by vacuum vapor deposition of Cr to a film thickness of 500 Å on an optically polished glass substrate, an amorphous silicon film of $p^+$ type with a thickness of 1000 Å was formed. The preparation conditions at that time were as follows:

Introduced gases:

$B_2H_6/SiH_4$ ($N_{BH}/N_{SiH}=10^{-1}$) (diluted with $H_2$ gas to 0.025 mol %)

rf power:

0.01 W/cm²

Pressure:

0.5 torr

Substrate temperature:

300° C.

Deposition speed:

30 Å/min.

Next, after the superfluous starting gases were discharged, new starting gases were fed to deposite a n-type amorphous silicon to 5000 Å. The preparation conditions were as follows.

Introduced gases:

$PH_3/SiH_4$ ($N_{PH}/N_{SiH}$=5×10$^{-3}$) (diluted with $H_2$ gas to 0.05 mol %)

rf power:

0.01 W/cm$^2$

Pressure:

0.5 torr

Substrate temperature:

300° C.

Deposition speed:

40 Å/min.

Also, after the starting gases were discharged, $SiH_4$ diluted with $H_2$ gas to 0.05 mol % was introduced into the chamber, and an i-phase amorphous silicon was deposited to 1000 Å under otherwise the same conditions.

By use of the recording medium as prepared above, the same recording and reproduction were effected in the same manner as in Example 10. As the result, recording and reproduction could be done with sufficient S/N ratio exhibited. For recording, reproduction and erasing, the following voltages were applied.

For recording: 20 V

For reproduction: 0.5 V

For erasing: −5 V

Having described about the methods for various recording media in the above Examples, any film forming method capable of preparing an extremely uniform film can be used and the method of the present invention is not limitative. The present invention is not also limitative of the substrate material, its shape and surface structure at all.

EXAMPLE 14

A recording/reproducing device shown in FIG. 10 was employed. As the probe electrodes 1002a, b, c, three tungsten probe electrodes 3 were employed. The probe electrodes 1002a, b, c were used for controlling the distance (Z) from the surface of the recording layer 101, and its distance (Z) is finely controlled by a piezoelectric element so that the current may be controlled to be constant. Further, the fine control mechanism 1007 is designed so that fine control may be possible also in the plane (X,Y) direction. However, all of these are known techniques. Also, the probe electrodes 1002a, b, c can be used for direct recording, reproduction and erasing. The recording medium is placed on the XY stage 1014 with high precision and can be moved to any desired position.

Next, the experiments of recording, reproduction and erasing by use of an LB film (8 layers) of squarilium-bis-6-octylazulene (hereinafter abbreviated as SOAZ) formed on the electrode 1003 formed of Au are described in detail.

A recording medium 1 having a recording layer 101 with 8 built-up SOAZ layers was placed on the XY stage 1014, and first the positions of the probe electrodes 1002a, b, c were determined and fixed firmly. Between the Au electrode (the ground side) 1003 and the probe electrode 1002, a voltage of −3.0 V was applied, and the distance (Z) between the probe electrode 1002 and the recording layer 101 surface was controlled while monitoring the current. Thereafter, the distance from the probe electrode 1002 to the surface of the recording layer 101 was changed by controlling the fine control mechanism 1007, whereby the current characteristics as shown in FIG. 2 were obtained. It is required that the probe voltage should be controlled so that the probe current Ip for controlling the distance from the probe electrode 1002 to the surface of the recording layer 101 may be $10^{-7}A>Ip>10^{-12}A$, preferably $10^{-8}A>Ip>10^{-10}A$.

First, the controlled current was set to the current value of the a region in FIG. 2 ($10^{-7}A$) (Condition of probe grounding). When the current value was measured by applying reading voltage of 1.5 V which was a voltage not exceeding the threshold voltage which gives rise to electric memory effect between the probe electrode 1002 and the Au electrode 1003, OFF state was exhibited at μA or less. Next, after a triangular pulse voltage having the waveform shown in FIG. 8 which is an voltage of or higher than the threshold voltage Vth ON which gives rise to ON state, the current was again measured by applying a voltage of 1.5 V between the electrodes, whereby a current of about 0.7 mA was found to flow, thus indicating the ON state.

Next, after a triangular pulse voltage with a peak voltage of 5 V and a pulse width of 1 μS which is a voltage of or higher than the threshold voltage Vth OFF at which the change occurs from the ON state to the OFF state, 1.5 V was again applied, whereby it was confirmed that the current value at this time was returned to OFF state at μA or less.

Next, with the probe current Ip being set at 10–99A (b region in FIG. 2), the distance Z between the probe electrode 1002a, b, c and the surface of the recording layer 101 was controlled.

Figure 11:
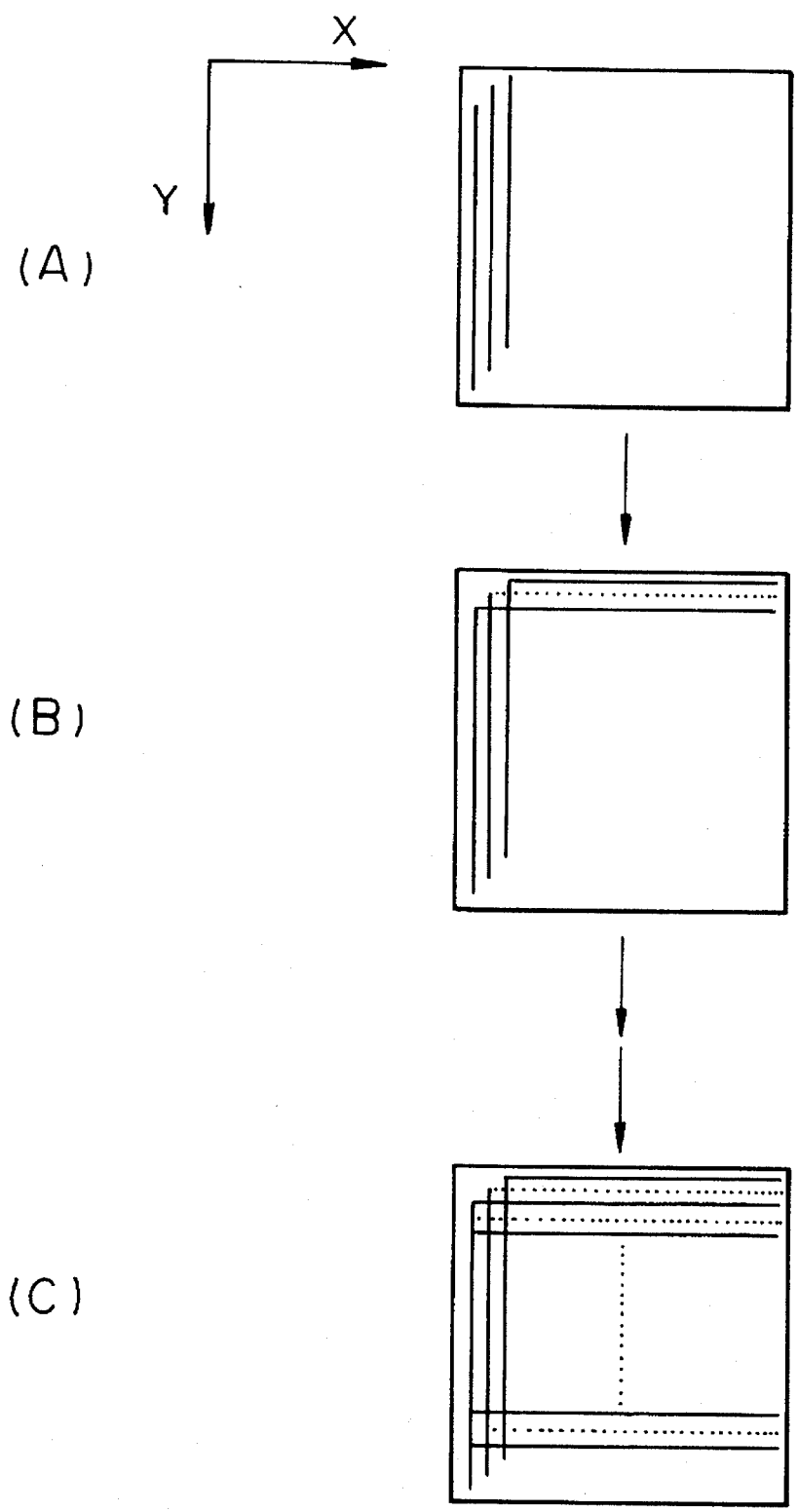
FIGS. 11A to 11C illustrate schematically the track and the recorded state of data in the recording medium.

While moving the XY stage slowly along the Y-axis under application of a triangular pulse voltage having the waveform as shown in FIG. 3 which is a voltage of the threshold voltage Vth ON or higher at which the ON state occurs at the three probes, the track signal Y track was recorded (FIG. 11A)

The probes 1002 a, b and c were returned to the original positions, then while applying a triangular pulse voltage having the waveform as shown in FIG. 3 which is a voltage of the threshold voltage Vth ON or higher at which the ON state occurs at the two probes (1002-a, c) along the X-axis, track signals along the X-axis were recorded (FIG. 11B).

The remaining one probe (1002-b) wrote the ON state by applying a pulse voltage (15 Vmax, 1 μS) of the threshold voltage Vth, ON or higher having the same waveform as in FIG. 3 at the predetermined position of the timing signal, and also the data were recorded at the remaining sites by use of the same method.

Next, the probe 1002-a was moved along the Y-axis to the track recorded with the probe 1002-c, and the same operation as described above was conducted. At this time, only the probe 1001a performs reading of the track signal. Subsequently, this operation was repeated until a recording medium having the track signals and the data recorded thereon was prepared (FIG. 11C).

Reading can be done by applying a probe voltage of 1.5 V for reading between the probe electrode 1002-b and the counter-electrode 1003, and reading directly the change in current quantity passing between the ON state region and OFF state region or through the servo circuit 1006. In this Example, it was confirmed that the probe current passing through the ON state region was found to be changed by 3 digits or more as compared with that before recording (or the OFF state region).

Further, as the result of tracing again the recording position by setting the probe voltage at 10 V of the threshold voltage Vth OFF or higher, it was also confirmed that all the recorded state was erased to be transited to the OFF state.

Next, by use of the fine control mechanism 1007, the resolving power was measured by writing stripes of 1 μ length with various pitches between 0.001 μ and 0.1 μ, and it was found to be 0.01 μ or less.

The SOAZ-LB film used in the above experiments was prepared as described below.

After an optically polished glass substrate (substrate 1004) was washed by use of a neutral detergent and Trichlene, Cr was deposited as the subbing layer by the vacuum deposition method to a thickness of 50 Å, and further Au was vapor deposited by the same method to 400 Å to form a subbing electrode (Au electrode 1003).

Next, a chloroform solution containing SOAZ dissolved at a concentration of 0.2 mg/ml was spread over an aqueous phase of 20° C. to form a monomolecular film on the water surface. After evaporation of the solvent, the surface pressure of such monomolecular film was enhanced to 20 mN/m, and further while this was maintained to be constant, the above electrode substrate was dipped gently at a speed of 5 mm/min. so as to transverse across the water surface, and further withdrawn to have two layers of Y-form monomolecular film built up. By repeating appropriate times of this operation, 6 kinds of 2, 4, 8, 12, 20 and 30 layers of built-up films were formed on the above substrate and used for recording and reproducing experiments. The evaluation results are shown in Table 3.

Evaluation was performed overall from the recording and erasing characteristics after applying the pulse and the erasing voltage, further the ratio of the current value under the recording state to that of the erased state (ON/OFF) and the resolving power, and those with particularly results were rated as A, those with good results as B, and those with relatively somewhat lower results as compared with others as C.

EXAMPLE 15

The experiments were conducted in the same manner as in Example 14 except for using t-butyl derivative of luthetium diphthalocyanine [LuH(Pc)$_2$] in place of the SOAZ recording medium used in Example 14. The results are summarized in Table 3. It was found that writing and reading of record could be done at sufficient S/N ratio as in the case of SOAZ.

The built-up conditions of t-butyl derivative of LuH(Pc)$_2$ are shown below.

Solvent: chloroform/trimethylbenzene/acetone (1/1/2)

Concentration: 0.5 mg/ml

Aqueous phase: pure water, water temperature 20° C.

Surface pressure: 20 mN/m, vertical moving speed of substrate 3 mm/min.

EXAMPLES 16–22

Recording media were prepared by use of the substrate electrode materials and the dye compounds shown in Table 4, and the same experiments as in Examples 14 and 15 were conducted with the controlled current value of the probe current set at 10$^{-9}$ A to obtain the results shown in Table 4. As shown by the mark B in the Table, recording and reproduction could be done at sufficient resolving power and ON/OFF ratio for all of the samples.

The built-up number of the dye LB film was all two layers. Also, the Pt electrode was vapor deposited by use of the EB method, and ITO by the sputtering method, respectively.

TABLE 3

| Organic Compound | Built-up Number | a Region | | | b Region | | | Resolving Power |
| --- | --- | --- | --- | --- | --- | --- | --- | --- |
| | | Recording Characteristic | ON/OFF Ratio | Erasability | Recording Characteristic | ON/OFF Ratio | Erasability | |
| SOAZ | 2 | A | B | A | A | A | A | Not more than 0.01μ |
| | 4 | A | B | A | A | A | A | " |
| | 8 | A | A | A | A | A | A | " |
| | 12 | A | A | A | A | A | A | " |
| | 20 | B | A | A | B | A | A | Not more than 0.1μ |
| | 30 | B | A | A | C | A | A | " |
| LuH(Pc)$_2$ | 2 | A | C | A | A | B | A | Not more than 0.03μ |
| | 4 | A | B | A | A | A | A | " |
| | 8 | A | B | A | A | A | A | " |
| | 12 | A | A | A | A | A | A | " |
| | 20 | B | A | A | C | A | A | Not more than 0.1μ |
| | 30 | C | A | A | C | A | A | " |

TABLE 4

| Example | Substrate Electrode | Dye Compound | Recording Reproducibility | Resolving Power |
| --- | --- | --- | --- | --- |
| 16 | Pt (100 Å) | SOAZ | O | Not more than 0.01μ |
| 17 | Cr/Au (50 Å/400 Å) | Tetraphenylporphyrine derivative* | O | Not more than 0.05μ |
| 18 | ITO (1000 Å) | SOAZ | O | Not more than 0.03μ |
| 19 | Cr/Au (50 Å/400 Å) | Anthracene derivative** | O | Not more than 0.1μ |

TABLE 4-continued

| Example | Substrate Electrode | Dye Compound | Recording Reproducibility | Resolving Power |
|---------|--------------------|--------------|--------------------------|-----------------|
| 20 | Cr/Au (50 Å/400 Å) | Docosylpyradinium-tetracyanoquinodimethane | ○ | Not more than 0.01µ |
| 21 | Cr/Au (50 Å/400 Å) | Pentacosa-10,12-diynoic acid | ○ | Not more than 0.01µ |
| 22 | Cr/Ar (50 Å/400 Å) | Bacteriorhodopsin*** | ○ | Not more than 0.05µ |

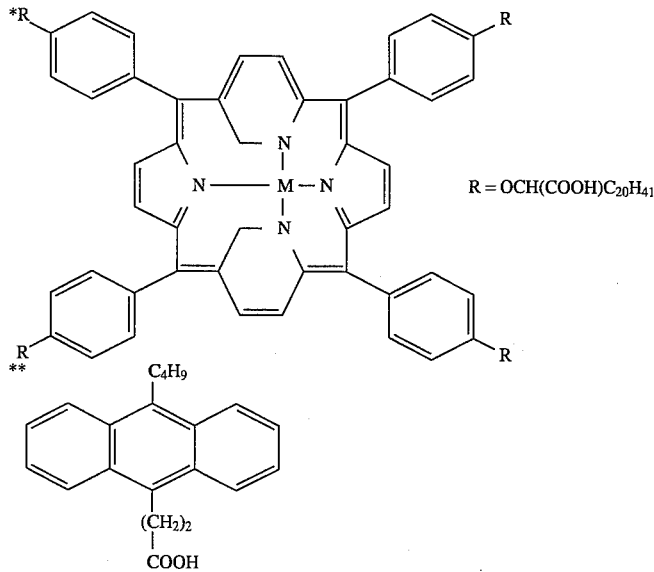

*R = OCH(COOH)$C_{20}H_{41}$

**(anthracene derivative with $C_4H_9$ and $(CH_2)_2$COOH substituents)

***violet film extracted from a cultured product obtained by culturing a highly halophilic bacterium according to the known method.

EXAMPLE 23

When the same experiments were conducted by use of the devices shown in FIGS. 10D–F, in place of the devices shown in FIGS. 10A–C, the same results were obtained.

In the Examples as described above, the LB method was employed for formation of the dye recording layer, but any film forming method can be used without limitation to the LB method, provided that an extremely thin film can be prepared, and specifically the vacuum vapor deposition method such as an MBE method, a CVD method, etc. may be included.

Applicable materials are not limited to only other organic compounds, but inorganic materials such as chalcogenide compounds, etc. are also applicable.

Further, it is also possible to use an integration of the electrode and the recording layer by use of a semiconductor as the electrode on the recording medium side.

The present invention is not limitative of the substrate material, its shape and surface structure at all. Also, although three probes are used in this Example, more numbers of probes can be also used.

EXAMPLE 24

A recording/reproducing device shown in FIG. 1 was employed. As the probe electrode 102, a probe electrode made of platinum was used. This probe electrode 102 is used for controlling the distance (Z) from the surface of the recording layer 101, and its distance (Z) is finely controlled by a piezoelectric element so that the current may be controlled to be constant. Further, the fine control mechanism 107 is designed so that fine control may be possible also in the plane (X,Y) direction. However, all of these are known techniques. Also, the probe electrode 102 can be used for direct recording, regeneration and erasing. The recording medium is placed on the XY stage 114 with high precision and can be moved to any desired position.

The experiments of recording, reproduction and erasing by use of an LB film (8 layers) of squarilium-bis-6-octyla-zulene (hereinafter abbreviated as SOAZ) formed on the electrode 108 formed of Au are described below in detail.

A recording medium 1 having a recording layer with 8 built-up SOAZ layers was placed on the XY stage 114, and first the position of the probe electrode 102 was determined and fixed firmly. Between the Au electrode (the ground side) 103 and the probe electrode 102, a voltage of −3.0 V was applied, and the distance (Z) between the probe electrode 102 and the recording layer 101 surface was controlled while monitoring the current. Thereafter, the distance from the probe electrode 102 to the surface of the recording layer 101 was changed by controlling the fine control mechanism 107, whereby the current characteristics as shown in FIG. 2 were obtained. It is required that the probe voltage should be controlled so that the probe current Ip for controlling the distance from the probe electrode 102 to the surface of the recording layer 101 may be $10^{-7}$ A>Ip>$10^{-12}$ A, preferably $10^{-8}$A>Ip>$10^{-10}$ A.

First, the controlled current was set to he current value of the a region in FIG. 2 ($10^{-7}$A)—(Condition of probe grounding). When the current value was measured by applying reading voltage of 1.5 V which was a voltage not exceeding the threshold voltage which gives rise to electric memory effect between the probe electrode 102 and the Au electrode 103, OFF state was exhibited at μA or less. Next, after a triangular pulse voltage having the waveform shown in FIG. 3 which is an voltage of or higher than the threshold voltage of Vth ON which gives rise to ON state, the current was again measured by applying a voltage of 1.5 V between the electrodes, whereby a current of about 0.7 mA was found to be flow, thus indicating the ON state.

Next, after a triangular pulse voltage with a peak voltage of 5 V and a pulse width of 1 μS which is a voltage of or more of the threshold voltage Vth OFF at which the change occurs from the ON state to the OFF state, 1.5 V was again applied, whereby it was confirmed that the current value at this time was returned to OFF state at μA or less.

Next, with the probe current Ip being set at $10^{-9}$ A (b region in FIG. 2), the distance Z between the probe electrode 102 and the surface of the recording layer 101 was controlled.

While moving the XY stage 114 at a constant interval (1 μ), a pulse voltage (15 Vmax, 1 μS) of the threshold value Vth ON or higher having the same waveform as in FIG. 3 was applied to write the ON state. Then, by applying a probe voltage of 1.5 V for reading between the probe electrode 102 and the counter-electrode 103, the change in current quantity passing between the ON state region and OFF state region can be directly read or through the servo circuit 106. In this Example, it was confirmed that the probe current passing through the ON state region was found to be changed by 3 digits or more as compared with that before recording (or the OFF state region).

Further, as the result of tracing again the recording position by setting the probe voltage at 10 V of the threshold voltage Vth OFF or higher, it was also confirmed that all the recorded state was erased to be transited to the OFF state.

Next, by use of the fine control mechanism 107, the resolving power was measured by writing stripes of 1 μ length with various pitches between 0.001 μ and 0.1 μ, and it was found to be 0.01 μ or less.

The SOAZ-LB film used in the above experiments was prepared as described below.

After an optically polished glass substrate (substrate 104) was washed by use of a neutral detergent and Trichlene, Cr was deposited as the subbing layer by the vacuum deposition method to a thickness of 50 Å, and further Au was vapor deposited by the same method to 400 Å to form a subbing electrode (Au electrode 103).

Next, a chloroform solution containing SOAZ dissolved at a concentration of 0.2 mg/ml was spread over an aqueous phase of 20° C. to form a monomolecular film on the water surface. After evaporation of the solvent, the surface pressure of such monomolecular film was enhanced to 20 mN/m, and further while this was maintained to be constant, the above electrode substrate was dipped gently at a speed of 5 mm/min. so as to transverse across the water surface, and further withdrawn to have two layers of Y-form monomolecular film built up. By repeating appropriate times of this operation, 6 kinds of 2, 4, 8, 12, 20 and 30 layers of built-up films were formed on the above substrate and used for recording and reproducing experiments. The evaluation results are shown in Table 1.

Evaluation was performed overall from the recording and erasing characteristics after applying the pulse and the erasing voltage, further the ratio of the current value under the recording state to that of the erased state (ON/OFF) and the resolving power, and those with particularly excellent results were rated as A, those with good results as B, and those with relatively somewhat lower results as compared with others as C.

EXAMPLE 25

The experiments were conducted in the same manner as in Example 1 except for using t-butyl derivative of luthetium diphthalocyanine [LuH(Pc)$_2$] in place of the SOAZ recording medium used in Example 24. The results are summarized in Table 5. It was found that writing and reading of record could be done at sufficient S/N ratio as in the case of SOAZ.

The built-up conditions of t-butyl derivative of LuH(Pc)$_2$ are shown below.

Solvent: chloroform/trimethylbenzene/acetone (1/1/2)

Concentration: 0.5 mg/ml

Aqueous phase: pure water, water temperature 20° C.

Surface pressure: 20 mN/m, vertical moving speed of the substrate 3 mm/min.

EXAMPLES 26–32

Recording media were prepared by use of the substrate electrode materials and the dye compounds shown in Table 6, and the same experiments as in Examples 24 and 25 were conducted with the controlled current value of the probe current set at $10^{-9}$ A to obtain the results shown in Table 6. As shown by the mark B in the Table, recording and reproduction could be done at sufficient resolving power and ON/OFF ratio for all of the samples.

The built-up number of the dye LB film was all two layers. Also, the Pt electrode was vapor deposited by use of the EB method, and ITO by the sputtering method, respectively.

TABLE 5

| Organic Compound | Built-up Number | a Region | | | b Region | | | Resolving Power |
| --- | --- | --- | --- | --- | --- | --- | --- | --- |
| | | Recording Characteristic | ON/OFF Ratio | Erasability | Recording Characteristic | ON/OFF Ratio | Erasability | |
| SOAZ | 2 | A | B | A | A | A | A | Not more than 0.01μ |
| | 4 | A | B | A | A | A | A | " |
| | 8 | A | A | A | A | A | A | " |
| | 12 | A | A | A | A | A | A | " |
| | 20 | B | A | A | B | A | A | Not more than 0.1μ |
| | 30 | B | A | A | C | A | A | " |
| LuH(Pc)$_2$ | 2 | A | C | A | A | B | A | Not more than 0.03μ |
| | 4 | A | B | A | A | A | A | " |
| | 8 | A | B | A | A | A | A | " |

TABLE 5-continued

| Organic Compound | Built-up Number | a Region | | | b Region | | | Resolving Power |
| --- | --- | --- | --- | --- | --- | --- | --- | --- |
| | | Recording Characteristic | ON/OFF Ratio | Erasability | Recording Characteristic | ON/OFF Ratio | Erasability | |
| | 12 | A | A | A | A | A | A | " |
| | 20 | B | A | A | C | A | A | Not more than 0.1µ |
| | 30 | C | A | A | C | A | A | " |

TABLE 6

| Example | Substrate Electrode | Dye Compound | Recording Reproducibility | Resolving Power |
| --- | --- | --- | --- | --- |
| 26 | Pt (100 Å) | SOAZ | ○ | Not more than 0.01µ |
| 27 | Cr/Au (50 Å/400 Å) | Tetraphenylporphyrine derivative* | ○ | Not more than 0.05µ |
| 28 | ITO (1000 Å) | SOAZ | ○ | Not more than 0.03µ |
| 29 | Cr/Au (50 Å/400 Å) | Anthracene derivative** | ○ | Not more than 0.1µ |
| 30 | Cr/Au (50 Å/400 Å) | Docosylpyradinium-tetracyanoquinodimethane | ○ | Not more than 0.01µ |
| 31 | Cr/Au (50 Å/400 Å) | Pentacosa-10,12-diynoic acid | ○ | Not more than 0.01µ |
| 32 | Cr/Ar (50 Å/400 Å) | Bacteriorhodopsin*** | ○ | Not more than 0.05µ |

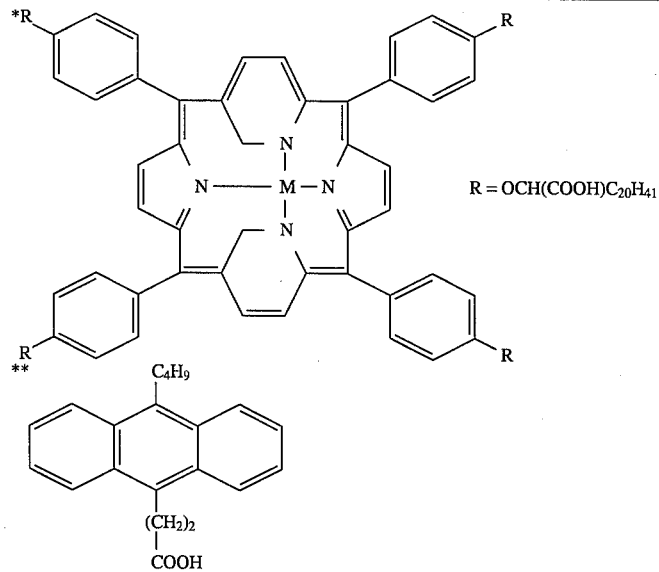

$R = OCH(COOH)C_{20}H_{41}$

***violet film extracted from a cultured product obtained by culturing a highly halophilic bacterium according to the known method.

In the Examples as described above, the LB method was employed for formation of the dye recording layer, but any film forming method can be used without limitation to the LB method, provided that an extremely thin film can be prepared, and specifically the vacuum vapor deposition method such as an MBE, an CVD method, etc. may be included.

Applicable materials are not limited to only organic compounds, but inorganic materials such as chalcogenide compounds, etc. are also applicable.

Further, it is also possible to use an integration of the electrode and the recording layer by use of a semiconductor as the electrode on the recording medium side.

The present invention is not limitative of the substrate material, its shape and surface structure at all.

EXAMPLE 33

A recording/reproducing device shown in FIG. 1 was employed. As the probe electrode 102, a probe electrode made of platinum was used. This probe electrode 102 is used for controlling the distance (Z) from the surface of the recording layer 101, and its distance (Z) is finely controlled by a piezoelectric element so that the current may be controlled constant. Further, the fine control mechanism 107 is designed so that fine control may be possible also in the plane (X,Y) direction. However, all of these are known techniques. Also, the probe electrode 102 can be used for direct recording, regeneration and erasing. The recording medium is placed on the XY stage with high precision and can be moved to any desired position.

Next, the experiments of recording, reproduction and erasing by use of a chalcogenide glass represented by the composition formula $Si_{16}Ge_{14}As_5Te_{65}$ (the subscriptions correspond to atomic %) (film thickness 2000 Å) formed on the electrode 103 formed of Au are described in detail.

A recording medium 1 having a recording layer 101 of the above chalcogenide glass having a thickness of 2000 Å was placed on the XY stage 114. Between the Au electrode (the ground side) 103 and the probe electrode 102, a voltage of 1.0 V was applied, and the distance (Z) between the probe electrode 102 and the recording layer 101 surface was controlled while monitoring the current. Thereafter, the fine control mechanism 107 was controlled so that the probe current Ip became $10^{-9}$ A.

It is required that the probe voltage should be controlled so that the probe current Ip for controlling the distance from the probe electrode 102 to the surface of the recording layer 101 may be $10^{-7}A > Ip > 10^{-12}A$, preferably $10^{-9}A > Ip > 10^{-10}A$.

While moving the XY stage 114 at a constant interval (1 μ), a rectangular pulse voltage (20 Vmax, 1 μS) of the threshold value Vth ON or higher was applied to give rise to a low resistance state (ON state). Then, by applying a probe voltage of 1.0 V for reading between the probe electrode 102 and the counter-electrode 103, the change in current quantity passing between the low resistance state region and the high resistance state region can be directly read or through the servo circuit 106. In this Example, it was confirmed that the probe current passing through the ON state region was found to be changed by 2 digits or more as compared with before recording the OFF state region).

Further, as the result of tracing again the recording position while applying a rectangular pulse voltage (50 Vmax, 10 μS) of or higher than the threshold voltage Vth OFF on the probe electrode, it was also confirmed that all the recorded state was erased to be transited to the OFF state. Erasing of recording is also possible by the optical method.

Next, by use of the fine control mechanism 107, the resolving power was measured by writing stripes of 1 μ length with various pitches between 0.01 μ and 1 μ, and it was found to be 0.1 μ or less.

The chalcogenide glass used in the above experiments was prepared as described below.

After an optically polished glass substrate (substrate 104) was washed by use of a neutral detergent and Trichlene, Cr was deposited as the subbing layer by the vacuum deposition method to a thickness of 50 Å, and further Au was vapor deposited by the same method to 400 Å to form a subbing electrode (Au electrode 103).

Next, an amorphous semiconductor represented by the atomic composition ratio of $Si_{16}Ge_{14}As_5Te_{65}$ was vapor deposited to a film thickness of 2000 Å by the vacuum vapor deposition method known in the art and used as the recording medium.

EXAMPLE 34

The same experiment as in Example 33 was conducted except for using $Ge_{15}Te_{81}Sb_2S_2$ in place of $Si_{16}Ge_{14}As_5Te_{65}$ used in Example 33. It was found that writing and reading of record could be done at sufficient S/N ratio similarly as in Example 33.

EXAMPLE 35

The same recording and reproducing experiment as in Example 33, except for using $CuTCNQF_4$ in place of the chalcogenide glass recording medium used in Examples 33 and 34. A rectangular pulse of 2 Vmax, 10 ns was used as the application voltage for recording, and the application voltage for control of the probe current was made 0.1 V. As the result, recording and reproduction could be done at sufficient S/N ratio similarly as in Example 33. The resolving power was not more than 0.1 μm. The method for preparation of the CuTCNQF4 recording medium is described below.

After an optically polished glass substrate was washed, Cu was deposited to 2000 Å according to the vacuum vapor deposition method to provide an electrode. Further, Cu and $TCNQF_4$ were co-deposited by the vacuum vapor deposition method to deposit a $Cu-TCNQF_4$ layer to 2000 Å (substrate temperature; room temperature). At this time, heating was effected by passing current value previously set so that the vapor deposition speed may become about Cu, 5 Å/s $TCNQF_4$, 20 Å/s. As the result, it was confirmed that a blue film by formation of $CuTCNQF_4$ was deposited.

EXAMPLE 36

After an electrode was formed by vacuum vapor deposition of Cr to a film thickness of 500 Å on an optically polished glass substrate, an amorphous silicon film of $p^+$ type with a thickness of 1000 Å was formed. The preparation conditions at that time were as follows:

Introduced gases: $B_2H_6/SiH_4$ ($N_{BH}/N_{SiH}=10^{-1}$) (diluted with $H_2$ Gas to 0.025 mol %)

rf power: 0.01 W/cm$^2$

Pressure: 0.5 torr

Substrate temperature: 300° C.

Deposition speed: 30 Å/min.

Next, after the superfluous starting Gases were discharged, new starting gases were fed to deposit a n-type amorphous silicon to 5000 Å. The preparation conditions were as follows.

Introduced gases: $PH_3/SiH_4$ ($N_{PH}/N_{SiH}=5\times10^{-3}$) (diluted with $H_2$ gas to 0.05 mol %)

rf power: 0.01 W/cm$^2$

Pressure: 0.5 torr

Substrate temperature: 300° C.

Deposition speed: 40 Å/min.

Also, after the starting gases were discharged, $SiH_4$ diluted with $H_2$ gas to 0.05 mol % was introduced into the chamber, and an i-phase amorphous silicon was deposited to 1000 Å under otherwise the same conditions.

By use of the recording medium as prepared above, the same recording and reproduction were effected. As the result, recording and reproduction could be done with sufficient S/N ratio exhibited. For recording, reproduction and erasing, the following voltages were applied.

For recording: 20 V

For reproduction: 0.5 V

For erasing: −5 V

Having described about the methods for various recording media in the above Examples, any film forming method capable of preparing an extremely uniform film can be used and the method of the present invention is not limitative. The present invention is not also limitative of the substrate material, its shape and surface structure at all.

EXAMPLE 36A

By use of Au as the electrode 103 shown in FIG. 1, an LB film having two layers of pentacosa-10, 12-diynoic acid (DA12-8) built up as the recording layer on the Au electrode was used.

Such polymerizable recording medium was mounted on ELS-3300 electron beam picture drawing device produced by Elionics Co., and a picture was drawn by use of a lattice pattern generating device shown in FIG. 12A under the conditions of an acceleration voltage of 20 kV, a current value of $1\times10^{-9}$A, a stationary spot diameter of 0.4 μm, an exposure time of 0.5 μsec/spot.

The magnification at this time was 50-fold.

Figure 12:
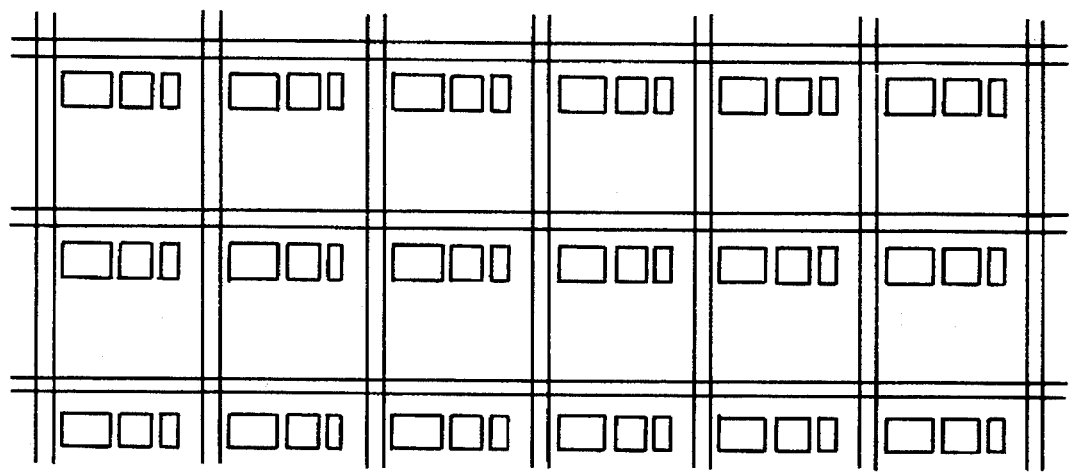
FIG. 12A is a schematic illustration of the recording pattern used in the present invention.
FIG. 12B is an enlarged view of the line pattern recorded within each lattice.
Figure 12:
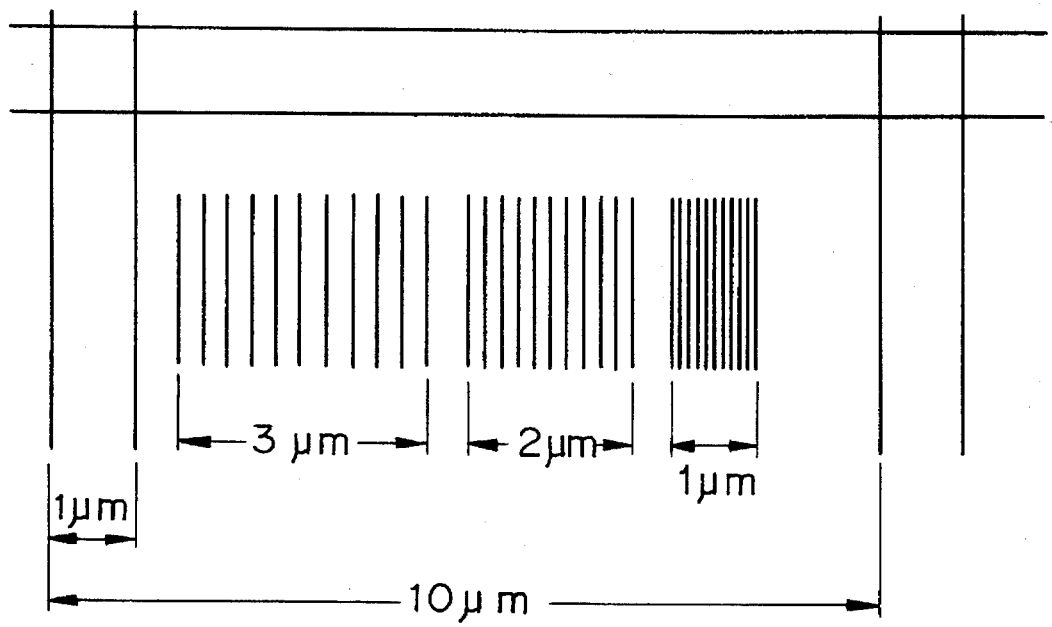

Next, under the conditions of an acceleration voltage of 20 kV, a current value of $1\times10^{-11}$A, a stationary spot diameter of 0.04 μm, an exposure time of 0.5 μsec/spot, a line pattern in FIG. 12 was similarly drawn within each lattice.

The pattern thus drawn was read by use of a reproducing device shown in FIG. 1. Next, its process is shown.

With the recording medium firmly fixed on the stage, first the position of the probe electrode was determined by visual observation. At a probe voltage set at 2 V, the distance between the probe electrode and the recording medium was controlled so that the probe current became $10^{-9}$ A by controlling the coarse mechanism in the Z direction. After the lattice pattern was first searched by coarse scanning in the direction within the plane (x, y), the line pattern was read by fine scanning within the plane (x, y), whereby the portion irradiated by the electron beam was polymerized and its film thickness was recognized to be changed (reduced) by about several Å as calculated on the changed amount of servo voltage. Also, the line width read was 0.022 μm and thus it was found that at least a recording resolving power of about 0.02 μm could be obtained.

The DA12-8 recording medium used in the above experiment was prepared as described below.

After an optically polished glass substrate was washed clean with a netural detergent and Trichlene, Cr was deposited to a thickness of 50 Å as the subbing layer by the vacuum vapor deposition method, and further Au was vapor deposited to 400 Å to form a subbing electrode. DA12-8 was dissolved in chloroform at a concentration of $1\times10^{-3}$M and 200 μl of the resultant solution was spread on an aqueous phase (MnCl$_2$: $5\times10^{-4}$M, KHCO$_3$: $5\times10^{-5}$M, pH 6.8, water temperature 20° C.).

After evaporation of the solvent, the surface pressure was enhanced to 20 mN/m, and further while maintaining the pressure to be constant, the above electrode substrate was dipped gently so as to transverse across the water surface and further withdrawn to build up two layers of a monomolecular film. The DA12-8 monomolecular built-up film thus formed on the Au electrode was dried on air for 24 hours to provide a recording medium.

EXAMPLE 37

Entirely the same experiment as in Example 36A was conducted except for using a recording medium having two layers of ω-tricosenic acid on n$^+$-Si substrate. However, the exposure time was set at 5 μsec/spot. The line width read was 0.013 μm, and a recording resolving power of about 0.01 μm may be expected.

The LB film forming conditions of ω-tricosenic acid were as follows.

Solvent: chloroform

Concentration: 1 mg/ml

Aqueous phase: H$_2$O (pure water), water temperture 20° C.

Surface pressure: 20 mN/m, vertical substrate moving speed 20 mm/min.

EXAMPLE 38

Entirely the same experiment as in Example 36A was conducted except for using two-layer built-up film of arachidic acid. However, the exposure time was made 20 μsec/spot. Recording was effected through change in the LB film structure based on generation of heat by electron beam irradiation, and the resolving power was poorer as compared with Examples 36A, 37 with the line width reproduced being 0.062 μm. The LB film forming conditions of arachidic acid were as follows.

Solvent: chloroform

Concentration: 1 mg/ml

Aqueous phase: CdCl$_2$ $5\times10^{-4}$M, water temperature 20° C.

Surface pressure: 30 mN/m, vertical substrate moving speed 5 mm/min.

EXAMPLE 39

On the same Au electrode as in Example 36, perylenetetracarboxylic acid anhydride:

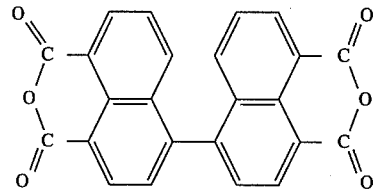

was vacuum vapor deposited (vapor deposition speed 5 Å/sec, film thickness 300 Å) to provide a recording medium, and otherwise the same recording and reproducing experiment as in Example 36A was conducted.

As the result of the experiment conducted at an exposure time of 200 μsec/spot, the electron beam irradiated portion was recognized to be blackened. The line width reproduced with a probe voltage of 2 V was found to be 0.04 μm.

EXAMPLE 40

The pattern shown in FIG. 12 was drawn on a p-form <111> wafer substrate (10 ohm-cm) in the same manner as in Example 36 by injecting P$^+$ ions by means of a converging ion beam device JIBL produced by Nippon Denshi K. K. The injection conditions were as follows.

Ion source accelerating voltage: 40 kV

Ion beam current: 1 nA

Injected amount: $1.3\times10^{14}$ ions/cm$^2$

Wafer temperature: 300° C.

Next, when the above pattern record was reproduced with a probe voltage of −0.5 V, the line width was found to be 0.083 μm on an average. Thus, it was found that a resolving power of about 0.1 μm or less could be obtained.

As the result of the heat treatment of the above recording medium at 600° C., although the resolving power was reduced to about 0.1 μm, stable reproduced signals could be obtained.

EXAMPLE 41

The pattern in FIG. 12 was drawn by injecting I⁻ ions by means of the same converging ion beam device in the same manner as in Example 40 on a recording medium having 13 layers of tetraquinodimethane docosylpyridium built up on an optically polished glass substrate.

The injection conditions were ion source acceleration voltage 40 kV, ion beam current 1000 pA, injected amount $5 \times 10^{13}$ ions/cm², and substrate temperature 20° C.

When pattern reproduction was effected with a probe voltage of 1 V, the line width was found to be 0.1 μm on an average.

In the Examples as described above, electron beam and ion beam were used as the energy beam, but the energy beam is not limited to these, but electromagnetic waves such as visible light, UV-ray and X-ray, etc. can be also used.

EXAMPLE 42

A recording/reproducing device shown in FIG. 10 was employed. As the probe electrodes 1002a, b, c, three tungsten probe electrodes were employed. The probe electrodes 1002a, b, c were used for controlling the distance (Z) from the surface of the recording layer 101, and its distance (Z) is finely controlled by a piezoelectric element so that the current may be controlled to be constant. Further, the fine control mechanism 1007 is designed so that fine control may be possible also in the plane (X,Y) direction. However, all of these are known techniques. Also, the probe electrodes 1002a, b, c can be used for direct recording, reproduction and erasing. The recording medium is placed on the XY stage 1014 with high precision and can be moved to any desired position.

Next, the experiments of recording, reproduction and erasing by use of an LB film (8 layers) of squarilium-bis-6-octylazulene (hereinafter abbreviated as SOAZ) formed on the electrode 1003 formed of Au are described in detail.

A recording medium 1 having a recording layer 101 with 8 built-up SOAZ layers was placed on the XY stage 1014, and first the positions of the probe electrodes 1002a, b, c were determined and fixed firmly. Between the Au electrode (the ground side) 1003 and the probe electrodes 1002a, b, c, a voltage of −3.0 V was applied, and the distance (Z) between the probe electrode 1002 and the recording layer 101 surface was controlled while monitoring the current. Thereafter, the distance from the probe electrode 1002 to the surface of the recording layer 101 was changed by controlling the fine control mechanism 1007, whereby the current characteristics as shown in FIG. 2 were obtained. It is required that the probe voltage should be controlled so that the probe current Ip for controlling the distance from the probe electrode 1002 to the surface of the recording layer 101 may be $10^{-7} A > Ip > 10^{-12}$ A, preferably $10^{-8} A > Ip > 10^{-10} A$.

First, the controlled current was set to the current value of the a region in FIG. 2 ($10^{-7}$A)—(Condition of probe grounding). When the current value was measured by applying reading voltage of 1.5 V which was a voltage not exceeding the threshold voltage which gives rise to electric memory effect between the probe electrode 1002 and the Au electrode 1003, OFF state was exhibited at μA or less. Next, after a triangular pulse voltage having the waveform shown in FIG. 3 which is an voltage of the threshold voltage of Vth ON or higher which gives rise to ON state, the current was again measured by applying a voltage of 1.5 V between the electrodes, whereby a current of about 0.7 mA was found to be passed, thus indicating the ON state.

Next, after a triangular pulse voltage with a peak voltage of 5 V and a pulse width of 1 μS which is a voltage of the threshold voltage Vth OFF or higher at which the change occurs from the ON state to the OFF state, 1.5 V was again applied, whereby it was confirmed that the current value at this time was returned to OFF state at μ A or less.

Next, with the probe current Ip being set at $10^{-9}$A (b region in FIG. 2), the distance Z between the probe electrode 102 and the surface of the recording layer 101 was controlled.

While moving the XY stage slowly along the Y-axis under application of a triangular pulse voltage having the waveform as shown in FIG. 3 which is a voltage of the threshold voltage ON or higher at which the ON state occurs at the three probes, the track signal Y track was recorded (FIG. 11A)

The probes 1002 a, b and c were returned to the original positions, then while applying a triangular pulse voltage having the waveform as shown in FIG. 3 which is a voltage of the threshold voltage Vth ON or higher at which the ON state occurs at the two probes (1002-a, c) along the X-axis, track signals along the X-axis were recorded (FIG. 11B).

The remaining one probe (1002-b) wrote the ON state by applying a pulse voltage (15 Vmax, 1 μS) of the threshold voltage Vth ON or higher having the same waveform as in FIG. 3 at the predetermined position of the timing signal, and also the data were recorded at the remaining sites by use of the same method.

Next, the probe 1002-a was moved along the Y-axis to the track recorded with the probe 1002-c, and the same operation as described above was conducted. At this time, only the probe 1001a performs reading of the track signal. Subsequently, this operation was repeated until a recording medium having the track signals and the data recorded thereon was prepared (FIG. 11C).

Reading can be done by applying a probe voltage of 1.5 V for reading between the probe electrode 1002-b and the counter-electrode 1003, and reading directly the change in current quantity passing between the ON state region and OFF state region or through the servo circuit 1006. In this Example, it was confirmed that the probe current passing through the ON state region was found to be changed by 3 digits or more as compared with before recording (or the OFF state region).

Further, as the result of tracing again the recording position by setting the probe voltage at 10 V of the threshold voltage Vth OFF or higher, it was also confirmed that all the recorded state was erased to be transited to the OFF state.

Next, by use of the fine control mechanism 1007, the resolving power was measured by writing stripes of 1 μ length with various pitches between 0.001 μ and 0.1 μ, and it was found to be 0.01 μ or less.

The SOAZ-LB film used in the above experiments was prepared as described below.

After an optically polished glass substrate (substrate 1004) was washed by use of a neutral detergent and Trichlene, Cr was deposited as the subbing layer by the vacuum deposition method to a thickness of 50 Å, and further Au was vapor deposited by the same method to 400 Å to form a subbing electrode (Au electrode 1003).

Next, a chloroform solution containing SOAZ dissolved at a concentration of 0.2 mg/ml was spread over an aqueous phase of 20° C. to form a monomolecular film on the water surface. After evaporation of the solvent, the surface pressure of such monomolecular film was enhanced to 20 mN/m, and further while this was maintained to be constant, the above electrode substrate was dipped gently at a speed of 5 mm/min. so as to transverse across the water surface, and further withdrawn to have two layers of Y-form monomolecular film built up. By repeating appropriate times of this operation, 6 kinds of 2, 4, 8, 12, 20 and 30 layers of built-up films were formed on the above substrate and used for recording and reproducing experiments. The evaluation results are shown in Table 7.

Evaluation was performed overall from the recording and erasing characteristics after applying the pulse and the erasing voltage, further the ratio of the current value under the recording state to that of the erased state (ON/OFF) and the resolving power, and those with particularly excellent results were rated as A, those with good results as B, and those with relatively somewhat lower results as compared with others as C.

EXAMPLE 43

The experiments were conducted in the same manner as in Example 42 except for using t-butyl derivative of luthetium diphthalocyanine [LuH(Pc)$_2$] in place of the SOAZ recording medium used in Example 42. The results are summarized in Table 7. It was found that writing and reading of record could be done at sufficient S/N ratio as in the case of SOAZ.

The built-up conditions of t-butyl derivative of LuH(Pc)$_2$ are shown below.

Solvent: chloroform/trimethylbenzene/acetone (1/1/2)

Concentration: 0.5 mg/ml

Aqueous phase: pure water, water temperature 20° C.

Surface pressure: 20 mN/m, vertical moving speed of substrate 3 mm/min.

EXAMPLES 44–50

Recording media were prepared by use of the substrate electrode materials and the dye compounds shown in Table 8, and the same experiments as in Examples 42 and 43 were conducted with the controlled current value of the probe current set at $10^{-9}$ A to obtain the results shown in Table 8. As shown by the mark B in the Table, recording and reproduction could be done at sufficient resolving power and ON/OFF ratio for all of the samples.

The built-up number of the dye LB film was all two layers. Also, the Pt electrode was vapor deposited by use of the EB method, and ITO by the sputtering method, respectively.

TABLE 7

| Organic Compound | Built-up Number | a Region | | | b Region | | | Resolving Power |
| --- | --- | --- | --- | --- | --- | --- | --- | --- |
| | | Recording Characteristic | ON/OFF Ratio | Erasability | Recording Characteristic | ON/OFF Ratio | Erasability | |
| SOAZ | 2 | A | B | A | A | A | A | Not more than 0.01μ |
| | 4 | A | B | A | A | A | A | " |
| | 8 | A | A | A | A | A | A | " |
| | 12 | A | A | A | A | A | A | " |
| | 20 | B | A | A | B | A | A | Not more than 0.1μ |
| | 30 | B | A | A | C | A | A | " |
| LuH(Pc)$_2$ | 2 | A | C | A | A | B | A | Not more than 0.03μ |
| | 4 | A | B | A | A | A | A | " |
| | 8 | A | B | A | A | A | A | " |
| | 12 | A | A | A | A | A | A | " |
| | 20 | B | A | A | C | A | A | Not more than 0.1μ |
| | 30 | C | A | A | C | A | A | " |

TABLE 8

| Example | Substrate Electrode | Dye Compound | Recording Reproducibility | Resolving Power |
| --- | --- | --- | --- | --- |
| 44 | Pt (100 Å) | SOAZ | O | Not more than 0.01μ |
| 45 | Cr/Au (50 Å/400 Å) | Tetraphenylporphyrine derivative* | O | Not more than 0.05μ |
| 46 | ITO (1000 Å) | SOAZ | O | Not more than 0.03μ |
| 47 | Cr/Au (50 Å/400 Å) | Anthracene derivative** | O | Not more than 0.1μ |
| 48 | Cr/Au (50 Å/400 Å) | Docosylpyradinium-tetracyanoquinodimethane | O | Not more than 0.01μ |
| 49 | Cr/Au | Pentacosa-10,12-diynoic | O | Not more than |

TABLE 8-continued

| Example | Substrate Electrode | Dye Compound | Recording Reproducibility | Resolving Power |
|---|---|---|---|---|
| 50 | (50 Å/400 Å) Cr/Ar (50 Å/400 Å) | acid Bacteriorhodopsin*** | ○ | 0.01μ Not more than 0.05μ |

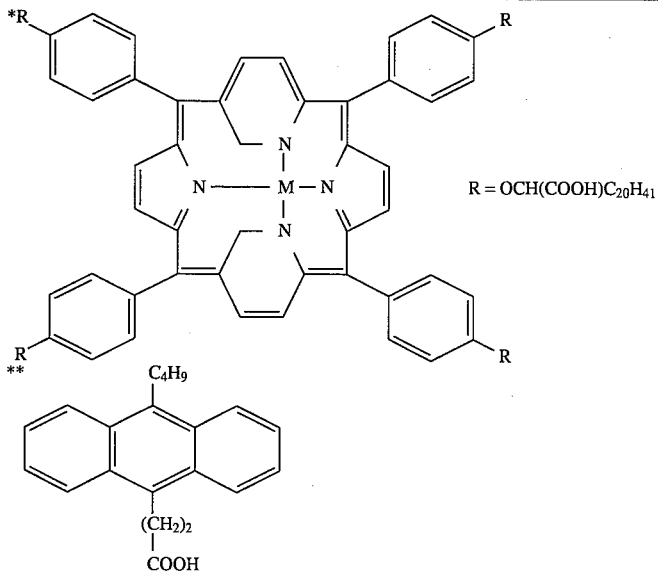

***violet film extracted from a cultured product obtained by culturing a highly halophilic bacterium according to the known method.

EXAMPLE 51

When the same experiments were conducted by use of the devices shown in FIGS. 10D-F, in place of the devices shown in FIGS. 10A-C employed in Examples 42-50, the same results were obtained.

In the Examples as described above, the LB method was employed for formation of the dye recording layer, but any film forming method can be used without limitation to the LB method, provided that an extremely thin film can be prepared, and specifically the vacuum vapor deposition method such as an MBE method, a GVD method, etc. may be included.

Applicable materials are not limited to only organic compounds, but inorganic materials such as chalcogenide compounds, etc. are also applicable.

Further, it is also possible to use an integration of the electrode and the recording layer by use of a semiconductor as the electrode on the recording medium side.

The present invention is not limitative of the substrate material, its shape and surface structure at all. More than three probes may be employed although three probes were employed in this invention.

According to the present invention, a novel recording and reproducing device having the following specific features can be provided.

(1) Even when compared with optical recording, by far higher density recording is possible.

(2) Since the recording layer is formed by building up monomolecular films, the film thickness control could be done easily on the molecular order (several Å to several ten Å). Also, since controllability is excellent, reproducibility is high when forming a recording layer.

(3) Since the recording is thin and good, productivity is high and an inexpensive recording medium can be provided.

(4) The energy required for reproduction is small and the power consumption is little.

(5) The recording speed and reading speed are rapid by providing track.

(6) The error ratio is low due to track and timing signals.

(7) A recording resolving power of 0.01 μm or more can be obtained and a high density recording better by 2 digits or more as compared with the optical recording method of the prior art is possible.

(8) Because the energy required for reading of record is small, there is no destruction of record accompanied with reproduction. Therefore, a large capacity file memory with good stability can be realized.

(9) The structure of the recording medium is simple and its preparation process is also simple. Therefore, due to excellent controllability, reproducibility is high when the element is formed and also productivity is rich.

(10) The scope of organic materials and inorganic materials which can be utilized for recording medium is broad, and also a very cheap recording medium can be provided.

What is claimed is:

1. Data writing and storage apparatus comprising:
   a memory having a surface and composed of a material which forms the surface and which is constituted by individual segments each having an atomic or molecular scale and each capable of individually undergoing a change in physical state in response to an electrical signal;
   an input section for placing each segment into a physical state corresponding to the value of a respective data bit, wherein said segments constitute the sole data bit memory, said input section comprising at least one needle having a fine tip portion dimensioned to apply an electrical signal to an individual memory segment in order to control the physical state of one segment at a time; and control means for controlling the input section, said control means comprising means for positioning the tip portion of the needle close to the surface of the memory, means for scanning the tip portion of the needle over the surface of the memory and means for controlling a distance between the tip portion of the needle and each individual segment on the surface of the memory while the tip portion of the needle scans thereover to effect change of the physical state of the individual segments to thereby write a data bit into each segment.

2. Apparatus as claimed in claim 1 wherein the tip portion of the needle is maintained at a selected distance from the surface of the memory so as to cause a tunnel effect effective to change the physical state of a selected segment.

3. Apparatus as claimed in claim 1, wherein the needle is manufactured by using semiconductor processing techniques.

4. Apparatus as claimed in claim 1, wherein a dielectric is used as the memory.

5. Apparatus as claimed in claim 1, wherein a polar compound is used as the memory.

6. Apparatus as claimed in claim 1, wherein a liquid crystal compound is used as the memory.

7. Apparatus as claimed in claim 1, wherein an element which has a changeable valence is used as the memory.

8. Apparatus as claimed in claim 1, wherein an electrochromic material is used as the memory.

9. Apparatus as claimed in claim 1, wherein the positioning means comprises an X–Y stage movable parallel to the memory surface and a coarse control unit for positioning the stage in a plane parallel to the memory surface.

10. Apparatus as claimed in claim 1, wherein the distance controlling means comprises a coarse control section and a control section for positioning the needle in a direction perpendicular to the memory surface.

11. Apparatus as claimed in claim 1, wherein each segment is 100 Å or less in size.

12. A memory reading apparatus comprising:

an output section for reading data bits stored in a memory having a surface and constituted, at the surface, by individual segments each having an atomic or molecular scale and each having a selected one of two physical states, the value of each data bit being represented by the selected physical state of a respective segment, wherein said segments constitute the sole data bit memory, said output section comprising at least one needle having a fine tip portion dimensioned to address an individual memory segment; and control means for controlling the output section, said control means comprising means for positioning the tip portion of the needle relative to the surface of the memory, means for scanning the tip portion of the needle over the surface of the memory and means for controlling a distance between the tip portion of the needle and each individual segment at the surface of the memory while the tip portion of the needle scans thereover to effect detection of the physical state of the individual segments to thereby read a data bit from each segment.

13. A memory reading apparatus as claimed in claim 12, wherein the needle is manufactured by using semiconductor processing techniques.

14. A memory reading apparatus as claimed in claim 12, wherein a dielectric is used as the memory.

15. A memory reading apparatus as claimed in claim 12, wherein an element which has different valencies is used as the memory.

16. A memory reading apparatus as claimed in claim 12, wherein a superlattice is used as the memory.

17. A memory reading apparatus as claimed in claim 12, wherein a superlattice in which a film thickness differs depending upon the positions in the surface of the memory is used as the memory.

18. A memory reading apparatus as claimed in claim 12, wherein molecules in which the orbital of an electron lone pair extends in a selected direction are used as the memory.

19. A memory reading apparatus as claimed in claim 12, wherein a polar compound is used as the memory.

20. A memory reading apparatus as claimed in claim 12, wherein the positioning means comprises an X–Y stage and a coarse control unit for positioning the needle in the X and Y directions.

21. A memory reading apparatus as claimed in claim 12, wherein the distance controlling means comprises a coarse control section and a Z-axis control section.

22. A memory reading apparatus as claimed in claim 12, wherein each segment is 100 Å or less in size.

23. A memory reading apparatus as claimed in claim 12, wherein the distance between the tip portion of the needle and the surface of the memory is maintained so as to cause a tunnel effect effective to detect the physical state of each segment.

24. A memory reading apparatus as claimed in claim 23, wherein the means for controlling a distance is operative in response to the tunnel effect occurring between the tip portion of the needle and the surface of the memory.

25. Data storage and reading apparatus comprising:

a memory having a surface and composed of a material which forms the surface and which is constituted by individual segments each having an atomic or molecular scale and each capable of individually assuming a physical state representing a respective data bit value;

an output section for reading the physical state of each segment corresponding to the value of a respective data bit, wherein said segments constitute the sole data bit memory said output section comprising at least one needle having a fine tip portion dimensioned to address an individual memory segment in order to read the physical state of one segment at a time; and control means for controlling said output section, said control means comprising means for positioning the tip portion of the needle relative to the surface of the memory, means for scanning the tip portion of the needle over the surface of the memory and means for controlling a distance between the tip portion of the needle and each individual segment on the surface of the memory while the tip portion of the needle scans thereover to effect detection of the physical state of the individual segments to thereby read a data bit from each segment.

26. A recording device having a recording portion comprising:

a probe electrode;

a fixed recording medium capable of at least a transition from a first state to a second state exhibiting a different electrical conductivity than the first state, said fixed recording medium being opposed to said probe electrode; and means for applying a writing voltage between said probe electrode and said fixed recording medium to cause the transition in the fixed recording medium according to information to be recorded, said fixed recording medium constituting the sole recording portion of said recording device.

27. A device according to claim 26, wherein the writing voltage is applied as a pulse voltage.

28. A device according to claim 26, wherein said recording medium comprises a base electrode and a recording film provided thereon.

29. A device according to claim 26, wherein said recording medium comprises a recording film capable of acting as an electrode.

30. A device according to claim 26, wherein a plural number of said probe electrodes are provided.

31. A device according to claim 26, wherein said recording medium comprises a monomolecular film of an organic compound or a built-up film of the monomolecular film.

32. A device according to claim 31, wherein said organic compound has a group having pi-electron level and a group having sigma-electron level in the molecule.

33. A device according to claim 31, wherein said organic compound is an organic dye compound.

34. A device according to claim 31, wherein said organic compound is at least one compound selected from dyes having a porphyrin skeleton, azulene type dyes, cyanine type dyes, dyes having a squatilium group, condensed heterocyclic compounds, diacetylene polymers, tetraquinodimethane, tetrathiafluvalene and metal complex compounds.

35. A device according to claim 31, wherein said monomolecular film or built-up film has a film thickness in the range of several Å to several thousands Å.

36. A device according to claim 31, wherein said monomolecular film or built-up film has a film thickness in the range of several Å to 500 Å.

37. A device according to claim 31, wherein said monomolecular film or built-up film has a film thickness in the range of 10 Å to 200 Å.

38. A device according to claim 31, wherein said monomolecular film or built-up film is a film formed by an LB method.

39. A device according to claim 26, wherein said recording medium is further capable of reverse state transition from the second state to the first state and said device further comprises means for erasing recorded information by causing the reverse state transition.

40. A device according to claim 39, wherein the reverse state transition is initiated by applying an erasing voltage between said probe electrode and said recording medium.

41. A device according to claim 26, further comprising means for controlling the positional relation between said probe electrode and said recording medium.

42. A device according to claim 41, wherein said means for controlling the positional relation comprises a three-dimensionally fine control means for the relative position of said probe electrode and said recording medium.

43. A device according to claim 41, wherein the positional relation is controlled in the direction parallel to the surface of said recording medium.

44. A device according to claim 43, wherein said means for controlling the positional relation is a XY scanning means for said probe electrode.

45. A device according to claim 41, wherein the positional relation is controlled in the direction normal to the surface of said recording medium.

46. A device according to claim 45, wherein the distance between said probe electrode and the surface of said recording medium is kept constant during recording.

47. A device according to claim 26, wherein said recording medium comprises a semiconductor.

48. A device according to claim 47, wherein said semiconductor is an amorphous semiconductor formed of a chalcogenide.

49. A device according to claim 48, wherein said chalcogenide contains at least one element of Groups III, IV, V, and VI of the periodic table and at least one element of Se, Te and As.

50. A device according to claim 47, wherein said semiconductor is a silicon film.

51. A device according to claim 50, wherein said silicon film is an amorphous silicon film.

52. A device according to claim 51, wherein said amorphous silicon is a p+/n/i laminate or n+/p/i laminate.

53. A device according to claim 47, wherein said semiconductor is an organic semiconductor.

54. A device according to claim 53, wherein said organic semiconductor is a compound containing an electron acceptor and a metal.

55. A device according to claim 54, wherein said electron acceptor is tetracyanoquinodimethane, tetracyanoethylene, tetrafluorotetracyanoquinodimethane or tetracyanonaphthoquinodimethane.

56. A reproducing device having a recording portion comprising:

a probe electrode;

a fixed recording medium capable of at least a transition from a first state to a second state exhibiting a different electrical conductivity than the first state, said fixed recording medium being opposed to said probe electrode; and means for applying a reading voltage between said probe electrode and said fixed recording medium to detect the transition occurring in the fixed recording medium according to recorded information, said fixed recording medium constituting the sole recording portion of said reproducing device.

57. A device according to claim 56, wherein the reading voltage is applied as a bias voltage.

58. A device according to claim 56, wherein said recording medium comprises a base electrode and a recording film provided thereon.

59. A device according to claim 56, wherein said recording medium comprises a recording film capable of acting as an electrode.

60. A device according to claim 56, wherein a plural number of said probe electrodes are provided.

61. A device according to claim 56, further comprising means for controlling the positional relation between said probe electrode and said recording medium.

62. A device according to claim 61, wherein said means for controlling the positional relation comprises a three-dimensionally fine control means for the relative position of said probe electrode and said recording medium.

63. A device according to claim 61, wherein the positional relation is controlled in the direction parallel to the surface of said recording medium.

64. A device according to claim 63, wherein said means for controlling the positional relation is a XY scanning means for said probe electrode.

65. A device according to claim 61, wherein the positional relation is controlled in the direction normal to the surface of said recording medium.

66. A device according to claim 65, wherein the distance between said probe electrode and the surface of said recording medium is kept constant during reproducing.

67. A device according to claim 56, wherein said means for applying a reading voltage further comprises means for reading the current passing through said recording medium.

68. A device according to claim 67, wherein said means for applying a reading voltage has a servo circuit.

69. A device according to claim 67, wherein said means for applying a reading voltage has an A/D transducer.

70. A device according to claim 56, wherein said recording medium comprises a monomolecular film of an organic compound or a built-up film of the monomolecular film.

71. A device according to claim 70, wherein said organic compound has a group having pi-electron level and a group having sigma-electron level in the molecule.

72. A device according to claim 70, wherein said organic compound is an organic dye compound.

73. A device according to claim 70, wherein said organic compound is at least one compound selected from dyes having a porphyrin skeleton, azulene type dyes, cyanine type dyes, dyes having a squarilium group, condensed heterocyclic compounds, diacetylene polymers, tetraquinodimethane, tetrathiafluvalene and metal complex compounds.

74. A device according to claim 70, wherein said monomolecular film or built-up film as a film thickness in the range of several Å to several thousands Å.

75. A device according to claim 70, wherein said monomolecular film or built-up film has a film thickness in the range of several Å to 500 Å.

76. A device according to claim 70, wherein said monomolecular film or built-up film has a film thickness in the range of 10 Å to 200 Å.

77. A device according to claim 70, wherein said monomolecular film or built-up film is a film formed by an LB method.

78. A device according to claim 56, wherein said recording medium comprises a semiconductor.

79. A device according to claim 78, wherein said semiconductor is a silicon film.

80. A device according to claim 78, wherein said semiconductor is an amorphous semiconductor formed of a chalcogenide.

81. A device according to claim 80, wherein said chalcogenide contains at least one element of Groups III, IV, V, and VI of the periodic table and at least one element of Se, Te and As.

82. A device according to claim 78, wherein semiconductor is an amorphous silicon film.

83. A device according to claim 82, wherein said amorphous silicon is p+/n/i laminate or n+/p/i laminate.

84. A device according to claim 78, wherein said semiconductor is an organic semiconductor.

85. A device according to claim 84, wherein said organic semiconductor is a compound containing an electron acceptor and a metal.

86. A device according to claim 85, wherein said electron acceptor is tetracyanoquinodimethane, tetracyanoethylene, tetrafluorotetracyanoquinodimethane or tetracyanonaphthoquinodimethane.

87. A recording-reproducing device having a recording portion comprising:

a probe electrode;

a fixed recording medium capable of at least a transition from a first state to a second state exhibiting a different electrical conductivity than the first state, said fixed recording medium being opposed to said probe electrode;

means for applying a writing voltage between said probe electrode and said fixed recording medium to cause the transition in the fixed recording medium according to information to be recorded; and means for applying a reading voltage between said probe electrode and said fixed recording medium to detect the transition occurring in the fixed recording medium according to recorded information, said fixed recording medium constituting the sole recording portion of said recording-reproducing device.

88. A device according to claim 87, wherein the writing voltage is applied as a pulse voltage.

89. A device according to claim 87, wherein the reading voltage is applied as a bias voltage.

90. A device according to claim 87, wherein said recording medium comprises a base electrode and a recording film provided thereon.

91. A device according to claim 87, wherein said recording medium comprises a recording film capable of acting as an electrode.

92. A device according to claim 87, wherein a plural number of said probe electrodes are provided.

93. A device according to claim 87, further comprising means for controlling the positional relation between said probe electrode and said recording medium.

94. A device according to claim 93, wherein said means for controlling the positional relation comprises a three-dimensionally fine control means for the relative position of said probe electrode and said recording medium.

95. A device according to claim 93, wherein the positional relation is controlled in the direction parallel to the surface of said recording medium.

96. A device according to claim 95, wherein said means for controlling the positional relation is a XY scanning means for said probe electrode.

97. A device according to claim 93, wherein the positional relation is controlled in a direction normal to the surface of said recording medium.

98. A device according to claim 97, wherein the distance between said probe electrode and the surface of said recording medium is kept constant during recording or reproducing.

99. A device according to claim 87, wherein said means for applying a reading voltage further comprises means for reading the current passing through said recording medium.

100. A device according to claim 99, wherein said means for applying reading voltage has a servo circuit.

101. A device according to claim 99, wherein said means for applying a reading voltage has an A/D transducer.

102. A device according to claim 87, wherein said recording medium is further capable of reverse state transition from the second state to the first state and said device further comprises means for erasing recorded information by causing the reverse state transition.

103. A device according to claim 102, wherein the reverse state transition is initiated by applying an erasing voltage between said probe electrode and said recording medium.

104. A device according to claim 87, wherein said recording medium comprises a monomolecular film of an organic compound or a built-up film of the monomolecular film.

105. A device according to claim 104, wherein said organic compound has a group having pi-electron level and a group having sigma-electron level in the molecule.

106. A device according to claim 104, wherein said organic compound is an organic dye compound.

107. A device according to claim 104, wherein said organic compound is at least one compound selected from dyes having a porphyrin skeleton, azulene type dyes, cyanine type dyes, dyes having a squatilium group, condensed heterocyclic compounds, diacetylene polymers, tetraquinodimethane, tetrathiafluvalene and metal complex compounds.

108. A device according to claim 104, wherein said monomolecular film or built-up film has a film thickness in the range of several Å to several thousands Å.

109. A device according to claim 104, wherein said monomolecular film or built-up film has a film thickness in the range of several Å to 500 Å.

110. A device according to claim 104, wherein said monomolecular film or built-up film has a film thickness in the range of 10 Å to 200 Å.

111. A device according to claim 104, wherein said monomolecular film or built-up film is a film formed by an LB method.

112. A device according to claim 87, wherein said recording medium comprises a semiconductor.

113. A device according to claim 112, wherein said semiconductor is an amorphous semiconductor formed of a chalcogenide.

114. A device according to claim 113, wherein said chalcogenide contains at least one element of Groups III, IV, V, and VI of the periodic table and at least one element of Se, Te and As.

115. A device according to claim 112, wherein said semiconductor is a silicon film.

116. A device according to claim 115, wherein said silicon film is an amorphous silicon film.

117. A device according to claim 116, wherein said amorphous silicon is a p+/n/i laminate or n+/p/i laminate.

118. A device according to claim 112, wherein said semiconductor is an organic semiconductor.

119. A device according to claim 118, wherein said electron acceptor is tetracyanoquinodimethane, tetracyanoethylene, tetrafluorotetracyanoquinodimethane or tetracyanonaphthoquinodimethane.

120. A device according to claim 118, wherein said organic semiconductor is a compound containing an electron acceptor and a metal.

121. An information recording method comprising the steps of:

preparing a probe electrode and a fixed recording medium in an opposing positional relationship, the recording medium being capable of a transition from at least a first state to a second state exhibiting a different electrical conductivity than the first state; and inputting information to be recorded by applying a writing voltage between the probe electrode and the fixed recording medium to cause the transition in the fixed recording medium according to the information, said fixed recording medium constituting the sole information recording portion.

122. A method according to claim 121, wherein the writing voltage is applied as a pulse voltage.

123. An information reproducing method comprising:

preparing a probe electrode and a fixed recording medium in an opposing positional relationship, the fixed recording medium being capable of a transition from at least a first state to a second state exhibiting a different electrical conductivity than the first state; and outputting information recorded in the fixed recording medium by applying a reading voltage between the probe electrode and the fixed recording medium to detect the transition occurring in the fixed recording medium according to the information, said fixed recording medium constituting the sole information recording portion.

124. A method according to claim 123, wherein the reading voltage is applied as a bias voltage.

125. A method according to claim 123, wherein the reading voltage does not cause the transition from the first state to the second state exhibiting a different electrical conductivity from the first state.

126. A method according to claim 123, wherein the transition is detected by reading the current passing through the recording medium.

127. A device for at least one of recording and reproducing information comprising a probe electrode, a recording medium disposed opposite to the to the probe electrode so that a tunnel current can flow when a voltage is applied therebetween and at least one of (a) means for applying a writing voltage between the probe electrode and the medium to record information thereon and (b) means for applying a reading voltage between the probe electrode and the medium to detect information recorded thereon, where the medium comprises organic molecules which have both a group containing only sigma electron levels and a group containing π electron levels.

128. A device according to claim 127, wherein the reading voltage is applied as a bias voltage.

129. A device according to claim 127, wherein the reading voltage leaves the information recorded on the medium unaffected.

130. A device according to claim 127, wherein means is present for applying a writing voltage between the probe electrode and the recording medium, and said means is arranged to apply the writing voltage as a pulse voltage.

131. A device according to claim 127, further comprising means for erasing the recorded information by applying a voltage between the probe electrode and the recording medium, said voltage being of opposite polarity to that of the recording voltage.

132. A device according to claim 127, wherein the recording medium comprises a film capable of acting as an electrode.

133. A device according to claim 127, wherein there are provided a plurality of the probe electrodes.

134. A device according to claim 127, wherein the recording medium has a surface.

135. A device according to claim 134, further comprising means for adjusting the positional relationship between the probe electrode and the recording medium.

136. A device according to claim 135, wherein the means is arranged to bring about fine adjustment in three dimensions between the relative position of the probe electrode and the recording medium.

137. A device according to claim 135, wherein the means is arranged to adjust the positional relationship in a direction parallel to the surface of the recording medium.

138. A device according to claim 137, wherein the means for controlling the positional relationship is an X,Y scanning means for the probe electrode.

139. A device according to claim 135, wherein the means is arranged to adjust the positional relationship in a direction normal to the surface of the recording means.

140. A device according to claim 139, wherein the means is arranged to maintain a constant distance between the probe electrode and the surface of the recording medium during recording or reproducing of information.

141. A device according to claim 127, wherein there is present means for applying a reading voltage between the probe electrode and the medium and said means further comprises means for reading a current passing through the recording medium when the reading voltage is applied.

142. A device according to claim 141, in which the means for applying a reading voltage has a servo circuit for reproducing information.

143. A device according to claim 141, wherein the means for applying a reading voltage has an A/D transducer for reproducing information.

144. A device according to claim 127, wherein the recording medium comprises a monomolecular film of an organic compound or a film built up from a plurality of monomolecular layers of an organic compound.

145. A device according to claim 144, wherein the organic compound is a dye.

146. A device according to claim 144, wherein said organic compound is selected from dyes having a porphyrin skeleton, azulene dyes, cyanine dyes, dyes having a squarilium group, condensed heterocyclic compounds, diacetylene polymers, tetraquinodimethane, tetrathiafluvalene and metal complex compounds.

147. A device according to claim 144, wherein the monomolecular film or built film has a thickness in the range of several Å to several thousand Å.

148. A device according to claim 144, in which the monomolecular film or built up film has a film thickness in the range of several Å to several 500 Å.

149. A device according to claim 144, wherein the monomolecular film or built up film has a thickness in the range of 10 Å to 200 Å.

150. A device according to claim 144, wherein the monomolecular film or built up film is a film that has been formed by a Langmuir-Blodgett method.

151. A device according to claim 127, wherein the recording medium comprises an organic semiconductor.

152. A device according to claim 151, wherein the organic semiconductor is a compound containing an electron acceptor and a metal.

153. A device according to claim 152, wherein the electron acceptor is selected from the group consisting of: tetracyanoquinodimethane, tetracyanoethylene, tetrafluorotetracyanoquinodimethane or tetracyanonaphthoquinodimethane.

154. A device for at least one of recording and reproducing information comprising a probe electrode, a recording medium disposed opposite to the probe electrode so that a tunnel current can flow when a voltage is applied therebetween and at least one of (a) means for applying a writing voltage between the probe electrode and the medium to record information thereon and (b) means for applying a reading voltage between the probe electrode and the medium to detect information recorded thereon, wherein the medium is an amorphous semiconductor.

155. A device according to claim 154, wherein the reading voltage is applied as a bias voltage.

156. A device according to claim 154, wherein the reading voltage leaves the information recorded on the medium unaffected.

157. A device according to claim 154, wherein means is present for applying a writing voltage between the probe electrode and the recording medium, and said means is arranged to apply the writing voltage as a pulse voltage.

158. A device according to claim 154, further comprising means for erasing the recorded information by applying a voltage between the probe electrode and the recording medium, said voltage being of opposite polarity to that of the recording voltage.

159. A device according to claim 154, wherein the recording medium comprises a film capable of acting as an electrode.

160. A device according to claim 154, wherein the are provided a plurality of the probe electrodes.

161. A device according to claim 154, wherein the recording medium has a surface.

162. A device according to claim 161, further comprising means for adjusting the positional relationship between the probe electrode and the recording medium.

163. A device according to claim 162, wherein the means is arranged to bring about fine adjustment in three dimensions between the relative position of the probe electrode and the recording medium.

164. A device according to claim 162, wherein the means is arranged to adjust the positional relationship in a direction parallel to the surface of the recording medium.

165. A device according to claim 164, wherein the means for controlling the positional relationship is an X,Y scanning means for the probe electrode.

166. A device according to claim 162, wherein the means is arranged to adjust the positional relationship in a direction normal to the surface of the recording means.

167. A device according to claim 166, wherein the means is arranged to maintain a constant distance between the probe electrode and the surface of the recording medium during recording or reproducing of information.

168. A device according to claim 154, wherein there is present means for applying a reading voltage between the probe electrode and the medium and said means further comprises means for reading a current passing through the recording medium when the reading voltage is applied.

169. A device according to claim 168, in which the means for applying a reading voltage has a servo circuit for reproducing information.

170. A device according to claim 168, wherein the means for applying a reading voltage has an A/D transducer for reproducing information.

171. A device according to claim 154, wherein the semiconductor is formed of a chalcogenide glass.

172. A device according to claim 171, wherein the chalcogenic glass contains at least one element of Groups III, IV, V and VI of the periodic table and at least one of Se, Te and As.

173. A device according to claim 154, wherein the silicon film is an amorphous silicon film.

174. A device according to claim 173, wherein the amorphous silicon film is a p+/n/i laminate or n+/p/i laminate.

175. A recording apparatus comprising:

a recording medium;

a probe electrode disposed in opposition to said recording medium;

means for applying a pulse voltage for writing across said recording medium and said probe electrode; and a mechanism for adjusting the distance between said recording medium and said probe electrode; characterized by servo means for controlling said mechanism to maintain a substantially constant current flowing between said recording medium and said probe electrode by feedbacking a control signal to said mechanism, said servo means including a hold circuit for holding the value of said control signal fed back to said mechanism when the pulse voltage is applied.

176. An apparatus as claimed in claim 175, characterized in that said means for applying a voltage is adapted to apply a substantially constant reading voltage whereby a change of the current flowing between said recording medium and said probe electrode can be read.

177. An apparatus according to claim 175, characterized in that said recording medium can undergo a transition from a first state to a second state, said second state having a different electrical conductivity from that of the first state, and the state transition can be effected by the writing voltage and/or detected by the reading voltage.

178. A recording device comprising:

a probe electrode;

a recording medium capable of at least a transition from a first state to a second state exhibiting a different electrical conductivity than the first state, said recording medium being opposed to said probe electrode; and means for applying a writing voltage between said probe electrode and said recording medium to cause the transition in the recording medium according to information to be recorded, without transfer of atomic particles to or from the surface of the recording medium, wherein said recording medium comprises a monomolecular film of an organic compound or a built-up film of the monomolecular film.

179. A recording-reproducing device comprising:

a probe electrode;

a recording medium capable of at least a transition from a first state to a second state exhibiting a different electrical conductivity than the first state, said recording medium being opposed to said probe electrode;

means for applying a writing voltage between said probe electrode and said recording medium to cause the transition in the recording medium according to information to be recorded without transfer of atomic particles to or from the surface of the recording medium; and means for applying a reading voltage between said probe electrode and said recording medium to detect the transition occurring in the recording medium according to recorded information, wherein said recording medium comprises a monomolecular film of an organic compound or a built-up film of the monomolecular film.

180. The device according to claim 178 or 179, wherein said organic compound has a group having pi-electron level and a group having sigma-electron level in the molecule.

181. The device according to claim 178 or 179, wherein said organic compound is an organic dye compound.

182. The device according to claim 178 or 179, wherein said organic compound is at least one compound selected from dyes having a porphyrin skeleton, azulene type dyes, cyanine type dyes, dyes having a squarilium group, condensed heterocyclic compounds, diacetylene polymers, tetraquinodimethane, tetrathiafluvalene and metal complex compounds.

183. The device according to claim 178 or 179, wherein said monomolecular film or built-up film has a film thickness in the range of several Å to several thousands Å.

184. The device according to claim 178 or 179, wherein said monomolecular film or built-up film has a film thickness in the range of several Å to 500 Å.

185. The device according to claim 178 or 179, wherein said monomolecular film or built-up film has a film thickness in the range of 10 Å to 200 Å.

186. The device according to claim 178 or 179, wherein said monomolecular film or built-up film is a film formed by an LB method.

187. A recording device comprising:

a probe electrode;

a recording medium capable of at least a transition from a first state to a second state exhibiting a different electrical conductivity than the first state, said recording medium being opposed to said probe electrode; and means for applying a writing voltage between said probe electrode and said recording medium to cause the transition in the recording medium according to information to be recorded, without transfer of atomic particles to or from the surface of the recording medium, wherein said recording medium comprises an amorphous semiconductor formed of a chalcogenide.

188. A recording-reproducing device comprising:

a probe electrode;

a recording medium capable of at least a transition from a first state to a second state exhibiting a different electrical conductivity than the first state, said recording medium being opposed to said probe electrode;

means for applying a writing voltage between said probe electrode and said recording medium to cause the transition in the recording medium according to information to be recorded without transfer of atomic particles to or from the surface of the recording medium; and means for applying a reading voltage between said probe electrode and said recording medium to detect the transition occurring in the recording medium according to recorded information, wherein said recording medium comprises an amorphous semiconductor formed of a chalcogenide.

189. The device according to claim 187 or 188, wherein said chalcogenide contains at least one element of Groups III, IV, V and VI of the periodic table and at least one element of Se, Te and As.

190. A recording device comprising:

a probe electrode;

a recording medium capable of at least a transition from a first state to a second state exhibiting a different electrical conductivity than the first state, said recording medium being opposed to said probe electrode; and means for applying a writing voltage between said probe electrode and said recording medium to cause the transition in the recording medium according to information to be recorded, without transfer of atomic particles to or from the surface of the recording medium, wherein said recording medium comprises a p+/n/i laminate or a n+/p/i laminate of an amorphous silicon semiconductor film.

191. A recording device comprising:

a probe electrode;

a recording medium capable of at least a transition from a first state to a second state exhibiting a different electrical conductivity than the first state, said recording medium being opposed to said probe electrode; and means for applying a writing voltage between said probe electrode and said recording medium to cause the transition in the recording medium according to information to be recorded, without transfer of atomic particles to or from the surface of the recording medium, wherein said recording medium comprises an organic semiconductor.

192. A recording-reproducing device comprising:

a probe electrode;

a recording medium capable of at least a transition from a first state to a second state exhibiting a different electrical conductivity than the first state, said recording medium being opposed to said probe electrode;

means for applying a writing voltage between said probe electrode and said recording medium to cause the transition in the recording medium according to information to be recorded without transfer of atomic particles to or from the surface of the recording medium; and means for applying a reading voltage between said probe electrode and said recording medium to detect the transition occurring in the recording medium according to recorded information, wherein said recording medium comprises an organic semiconductor.

193. The device according to claim 191 or 192, wherein said organic semiconductor is a compound containing an electron acceptor and a metal.

194. The device according to claim 193, wherein said electron acceptor is tetracyanoquinodimethane, tetracyanoethylene, tetrafluorotetracyanoquinodimethane or tetracyanonaphthoquinodimethane.

195. A recording-reproducing device comprising:

a probe electrode;

a recording medium capable of at least a transition from a first state to a second state exhibiting a different electrical conductivity than the first state, said recording medium being opposed to said probe electrode;

means for applying a writing voltage between said probe electrode and said recording medium to cause the transition in the recording medium according to information to be recorded without transfer of atomic particles to or from the surface of the recording medium; and means for applying a reading voltage between said probe electrode and said recording medium to detect the transition occurring in the recording medium according to recorded information, wherein said recording medium comprises a p+/n/i laminate or a n+/p/i laminate of an amorphous silicon semiconductor film.

* * * * *

UNITED STATES PATENT AND TRADEMARK OFFICE
CERTIFICATE OF CORRECTION

PATENT NO. : 5,623,476

DATED : April 22, 1997

INVENTOR(S): KEN EGUCHI ET AL.

It is certified that error appears in the above-identified patent and that said Letters Patent is hereby corrected as shown below:

<u>ON TITLE PAGE, AT [56] REFERENCES CITED, OTHER PUBLICATIONS</u>

"G. Binning" (both occurrences) should read --G. Binnig--;

"IBm" should read --IBM-- and, under Drake et al, "of" should read --or--.

<u>ON TITLE PAGE, AT [56] REFERENCES CITED, U.S. PATENT DOCUMENTS</u>

"4,747,698 5/1988 Wichrumasinghe et al." should read --4,747,698 5/1988 Wickramasinghe et al.--

<u>ON TITLE PAGE, AT [56] REFERENCES CITED, FOREIGN PATENT DOCUMENTS</u>

"3512060 4/1985 Germany" should read --3512060 10/1985 Germany--.

<u>COLUMN 2</u>

Line 6, "order" should read --on the order--;
Line 13, "technique" should read --techniques--.
Line 21, "element" should read --elements--.

UNITED STATES PATENT AND TRADEMARK OFFICE
CERTIFICATE OF CORRECTION

PATENT NO. : 5,623,476

DATED : April 22, 1997

INVENTOR(S): KEN EGUCHI ET AL.

It is certified that error appears in the above-identified patent and that said Letters Patent is hereby corrected as shown below:

COLUMN 3

Line 50, "porphyrine" should read --porphyrin--;
Line 52, "squatilium" should read --squarilium--.

COLUMN 4

Line 9, "analogues" should read --analogs--;
Line 44, "these" should read --such a--.

COLUMN 7

Line 16, "5<n<30" should read --5≤n≤30--;
Line 22, "Squatilium" should read --Squarilium--;
Line 25, "squatilium" should read --squarilium--.

COLUMN 8

Line 2, "10)" should read --11)--.

COLUMN 13

Line 53, "atomics)," should read --atomic %),--.

COLUMN 14

Figure 5:
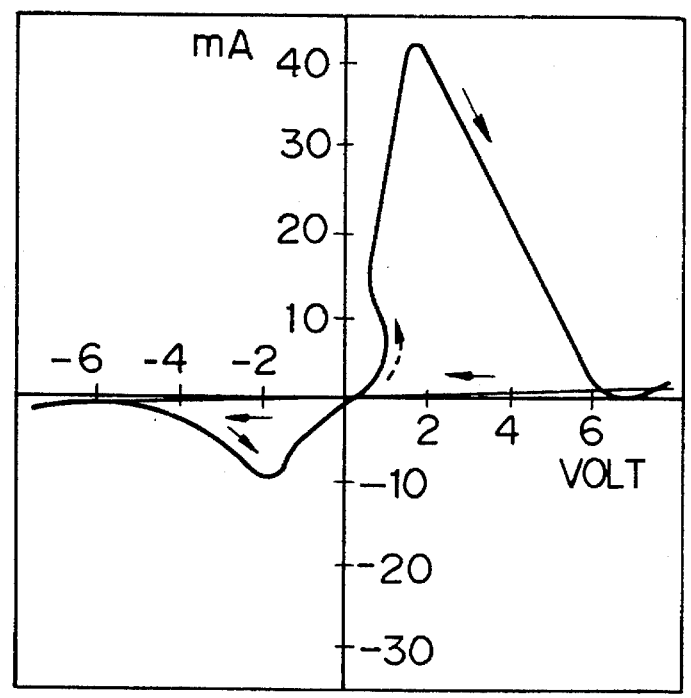
FIGS. 5 and 6 are characteristic graphs showing electrical characteristics obtained in the device shown in FIG. 4.

Line 26, "metal/a-St" should read --metal/a-Si--;
Line 67, "FIG. 8" should read --FIG. 5--.

UNITED STATES PATENT AND TRADEMARK OFFICE
CERTIFICATE OF CORRECTION

PATENT NO.   : 5,623,476

DATED        : April 22, 1997

INVENTOR(S)  : KEN EGUCHI ET AL.

It is certified that error appears in the above-identified patent and that said Letters Patent is hereby corrected as shown below:

COLUMN 18

Line 35,  "squatilium" should read --squarilium--;
   Line 45,  "AG," should read --Ag,--.

COLUMN 19

Line 17,  "$10^{-7}A > Ip > 10^{-12}A,$" should read --$10^{-7}A \geq Ip \geq 10^{-12}A,$--;
   Line 18,  "$10^{-8}A > Ip > 10^{-10}A.$" should read --$10^{-8}A \geq Ip \geq 10^{-10}A.$-- ;
   Line 27,  "an" should read --a--;
   Line 32,  "as" should read --a--.

COLUMN 20

Line 36,  "[LuH(pc)$_2$]" should read --[LuH(Pc)$_2$]--.

COLUMN 23

Line 28,  "subscriptions" should read --subscripts--;
   Line 43,  "$10^{-7}A > Ip > 10^{-12}A,$" should read --$10^{-7}A \geq Ip \geq 10^{-12}A,$--;
   Line 44,  "$10^{-8}A > Ip > 10^{-10}A.$" should read --$10^{-8}A \geq Ip \geq 10^{-10}A.$--.

COLUMN 24

Line 67,  "a" should read --an--.

UNITED STATES PATENT AND TRADEMARK OFFICE
CERTIFICATE OF CORRECTION

PATENT NO. : 5,623,476

DATED : April 22, 1997

INVENTOR(S) : KEN EGUCHI ET AL.

It is certified that error appears in the above-identified patent and that said Letters Patent is hereby corrected as shown below:

COLUMN 26

Line 3, "$10^{-7}A > Ip > 10^{-12}A$," should read --$10^{-7}A \geq Ip \geq 10^{-12}A$,--
  and "$10^{-8}A > Ip > 10^{-10}A$." should read --$10^{-8}A \geq Ip \geq 10^{-10}A$.--;
Line 5, "($10^{-7}A$) (Condition" should read
  --($10^{-7}A$) - (Condition--;
Line 11, "an" should read --a--.

COLUMN 30

Line 61, "$10^{-7}A > Ip > 10^{-12}A$," should read --$10^{-7}A \geq Ip \geq 10^{-12}A$,--;
Line 62, "$10^{-8}A > Ip > 10^{-10}A$." should read --$10^{-8}A \geq Ip \geq 10^{-10}A$.-- ;
Line 63, "he" should read --the--.

COLUMN 31

Line 4, "an" should read --a--;
Line 8, "be" should be deleted.

COLUMN 35

Line 11, "subscriptions" should read --subscripts--;
Line 26, "$10^{-T}A > Ip > 10^{-12}A$," should read --$10^{-7}A \geq Ip \geq 10^{-12}A$,--;
  and "$10^{-9}A > Ip 10^{-11}$" should read --$10^{-8}A \geq Ip \geq 10^{-10}A$.--.
Line 27, "10A." should be deleted.

UNITED STATES PATENT AND TRADEMARK OFFICE
CERTIFICATE OF CORRECTION

PATENT NO. : 5,623,476

DATED : April 22, 1997

INVENTOR(S): KEN EGUCHI ET AL.

It is certified that error appears in the above-identified patent and that said Letters Patent is hereby corrected as shown below:

COLUMN 36

Line 16, "CuTCNQF4" should read --$CuTCNQF_4$--.

COLUMN 37

Line 45, "netural" should read --neutral--.
Line 59, "on" (2nd occurrence) should read --in--.

COLUMN 38

Line 35, " 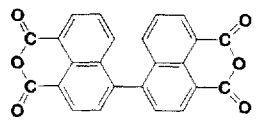 " should read --  --.

COLUMN 39

Line 60, "$10^{-7}A>Ip>10^{-12}A$," should read --$10^{-7}A \geq Ip \geq 10^{-12}A$,-- and "$10^{-8}A>Ip>10^{-11}$" should read --$10^{-8}A \geq Ip \geq 10^{-10}A$.--.
Line 61, "10A." should be deleted.

UNITED STATES PATENT AND TRADEMARK OFFICE
CERTIFICATE OF CORRECTION

PATENT NO. : 5,623,476

DATED : April 22, 1997

INVENTOR(S) : KEN EGUCHI ET AL.

It is certified that error appears in the above-identified patent and that said Letters Patent is hereby corrected as shown below:

COLUMN 40

Line 3, "an" should read --a--.

COLUMN 41

Line 10, "transverse" should read --traverse--.

COLUMN 46

Line 44, "memory" should read --memory,--.

COLUMN 47

Line 28, "squatilium" should read --squarilium--.

COLUMN 51

Line 4, "squatilium" should read --squarilium--.

COLUMN 54

Line 4, "the" should read --there--.

UNITED STATES PATENT AND TRADEMARK OFFICE
CERTIFICATE OF CORRECTION

PATENT NO. : 5,623,476

DATED : April 22, 1997

INVENTOR(S) : KEN EGUCHI ET AL.

It is certified that error appears in the above-identified patent and that said Letters Patent is hereby corrected as shown below:

COLUMN 55

Line 58, "several A" should read --several Å--.

Signed and Sealed this

Twenty-third Day of June, 1998

*Attest:*

BRUCE LEHMAN

*Attesting Officer*  *Commissioner of Patents and Trademarks*